(12) United States Patent
Kawashima et al.

(10) Patent No.: US 12,355,379 B2
(45) Date of Patent: Jul. 8, 2025

(54) POWER CONVERSION SYSTEM

(71) Applicant: DAIKIN INDUSTRIES, LTD., Osaka (JP)

(72) Inventors: Reiji Kawashima, Osaka (JP); Koudai Okuzono, Osaka (JP); Keisuke Ohta, Osaka (JP); Masaki Kono, Osaka (JP); Masahide Fujiwara, Osaka (JP); Yuu Yoshikawa, Osaka (JP); Hirotaka Saruwatari, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 175 days.

(21) Appl. No.: 18/136,085

(22) Filed: Apr. 18, 2023

(65) Prior Publication Data

US 2023/0261601 A1    Aug. 17, 2023

Related U.S. Application Data

(63) Continuation of application No. PCT/JP2021/038471, filed on Oct. 18, 2021.

(30) Foreign Application Priority Data

Oct. 19, 2020 (JP) ................. 2020-175529

(51) Int. Cl.
*H02J 3/01* (2006.01)
*H02M 1/12* (2006.01)
(Continued)

(52) U.S. Cl.
CPC ............. *H02P 27/06* (2013.01); *H02J 3/01* (2013.01); *H02M 1/12* (2013.01); *H02P 29/50* (2016.02)

(58) Field of Classification Search
CPC ............ H02M 1/12; H02M 1/14; H02M 1/15; H02M 5/458; H02M 5/4585; H02M 7/537;
(Continued)

(56) References Cited

U.S. PATENT DOCUMENTS

2015/0323232 A1*  11/2015  Kawashima ........... F25B 43/003
363/48
2016/0226425 A1    8/2016  Kawashima
(Continued)

FOREIGN PATENT DOCUMENTS

EP    3 054 572 A1    8/2016
EP    3 160 031 A1    4/2017
(Continued)

OTHER PUBLICATIONS

International Search Report of corresponding PCT Application No. PCT/JP2021/038471 dated Dec. 7, 2021.
(Continued)

*Primary Examiner* — Fred E Finch, III
(74) *Attorney, Agent, or Firm* — GLOBAL IP COUNSELORS, LLP

(57) ABSTRACT

A power conversion system includes an inverter circuit, a harmonic reducer, and a synchronizer. The inverter circuit is operable with electric power supplied from an alternating-current power source. The harmonic reducer is connected to the alternating-current power source. The inverter circuit includes a circuit main portion and a conversion control unit configured to control the circuit main portion. The harmonic reducer includes a current control unit configured to perform control to reduce a harmonic current flowing to the alternating-current power source. The synchronizer is configured to synchronize a state of the harmonic reducer with a state of the inverter circuit.

20 Claims, 22 Drawing Sheets

(51) Int. Cl.
*H02P 27/06* (2006.01)
*H02P 29/50* (2016.01)

(58) Field of Classification Search
CPC .... H02M 7/5387; H02M 7/53871; H02J 3/01; H02J 3/1814; H02P 27/06; H02P 27/08; H02P 29/50
See application file for complete search history.

(56) References Cited

U.S. PATENT DOCUMENTS

| | | | |
|---|---|---|---|
| 2016/0268923 A1* | 9/2016 | Bremicker | ............ H02M 7/487 |
| 2016/0329805 A1 | 11/2016 | Ghosh et al. | |
| 2019/0252881 A1* | 8/2019 | Kono | ...................... H02M 1/12 |

FOREIGN PATENT DOCUMENTS

| | | | |
|---|---|---|---|
| JP | 2015-92813 A | 5/2015 | |
| KR | 10-2019-0051331 A | 5/2019 | |

OTHER PUBLICATIONS

European Search Report of corresponding EP Application No. 21 88 2780.6 dated Aug. 27, 2024.
International Preliminary Report of corresponding PCT Application No. PCT/JP2021/038471 dated May 4, 2023.

* cited by examiner

POWER CONVERSION SYSTEM

CROSS-REFERENCE TO RELATED APPLICATIONS

This is a continuation of International Application No. PCT/JP2021/038471 filed on Oct. 18, 2021, which claims priority to Japanese Patent Application No. 2020-175529, filed on Oct. 19, 2020. The entire disclosures of these applications are incorporated by reference herein.

BACKGROUND

Technical Field

The present disclosure relates to a power conversion system including an inverter circuit, which operates with electric power supplied from an alternating-current power source, and a harmonic reducer connected to the alternating-current power source.

Background Art

Japanese Unexamined Patent Publication No. 2015-92813 discloses a power conversion system including an inverter circuit, which operates with electric power supplied from an alternating-current power source, and a harmonic reducer connected to the alternating-current power source. In this power conversion system, the inverter circuit includes a circuit main portion and a conversion control unit that controls the circuit main portion, and the harmonic reducer includes a current control unit that performs control to reduce the harmonic current flowing to the alternating-current power source.

SUMMARY

A first aspect of the present disclosure is directed to a power conversion system including an inverter circuit, a harmonic reducer, and a synchronizer. The inverter circuit is operable with electric power supplied from an alternating-current power source. The harmonic reducer is connected to the alternating-current power source. The inverter circuit includes a circuit main portion and a conversion control unit configured to control the circuit main portion. The harmonic reducer includes a current control unit configured to perform control to reduce a harmonic current flowing to the alternating-current power source. The synchronizer is configured to synchronize a state of the harmonic reducer with a state of the inverter circuit.

DETAILED DESCRIPTION OF EMBODIMENT(S)

Embodiments of the present disclosure will be described below with reference to the drawings. The following embodiments are merely illustrative in nature, and are not intended to limit the scope, applications, or use of the present invention.

FIRST EMBODIMENT

Figure 1:
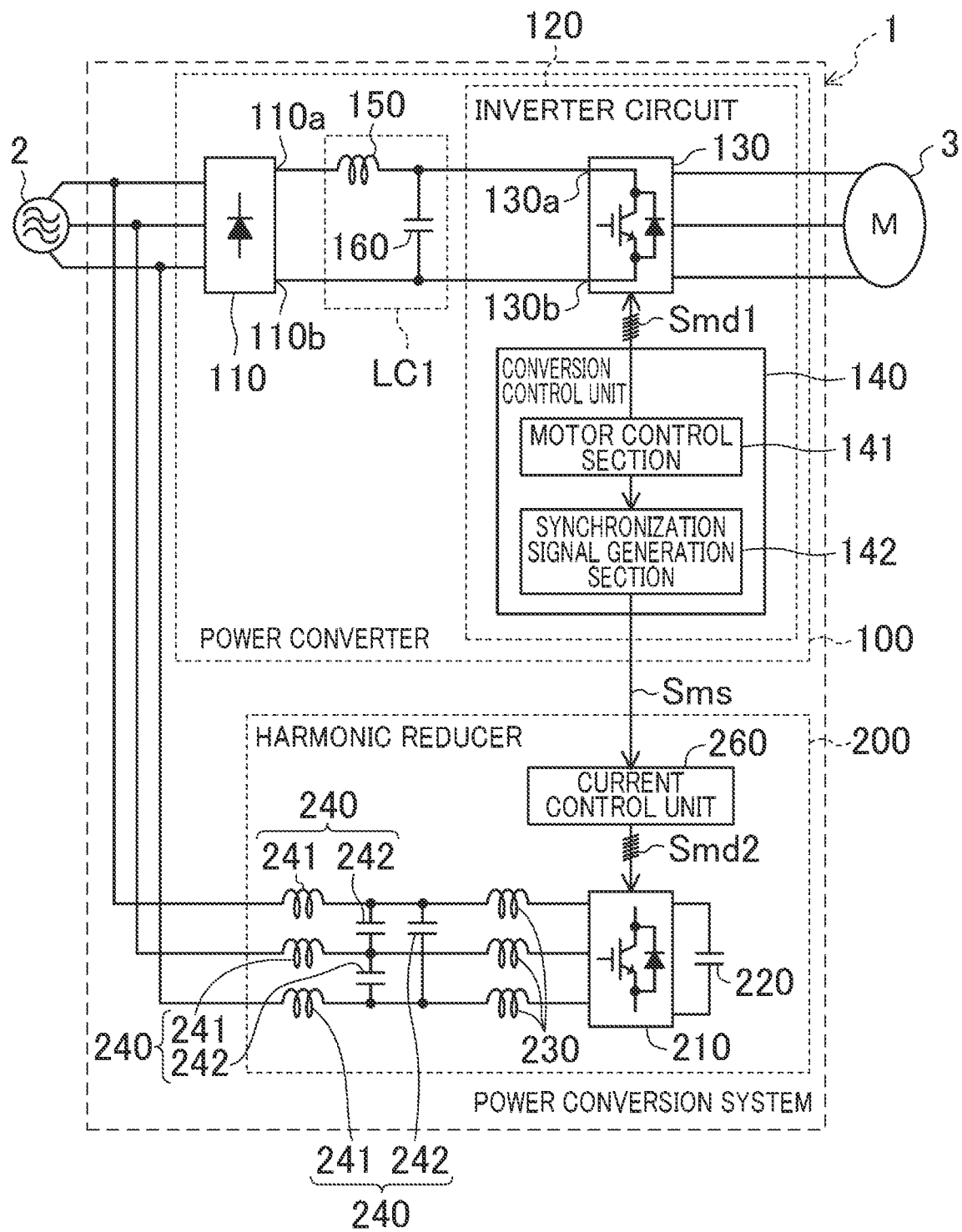
FIG. 1 is a block diagram illustrating a configuration of a power conversion system according to a first embodiment.

FIG. 1 shows a power conversion system (1) according to a first embodiment of the present disclosure. This power conversion system (1) includes a power converter (100) and a harmonic reducer (200).

The power converter (100) performs power conversion of three-phase alternating currents input by an alternating-current power source (2), and supplies the converted alternating currents to a motor (3) serving as a load. The three-phase alternating currents are supplied to the power converter (100) via three conductive wires.

The power converter (100) includes a rectifier circuit (110), an inverter circuit (120), a conversion control unit (140), a power converter reactor (150), and a power converter capacitor (160).

The rectifier circuit (110) rectifies a first alternating current supplied from the alternating-current power source (2), and outputs the resultant direct current to first and second output nodes (110a, 110b). More specifically, the rectifier circuit (110) is a full-wave rectifier circuit. The rectifier circuit (110) includes six diodes connected in a bridge configuration. These diodes are directed with their cathodes connected to a first output node (110a) side and their anodes connected to a second output node (110b) side.

The inverter circuit (120) converts a direct current received from the alternating-current power source (2) via the rectifier circuit (110) into a second alternating current, and outputs the second alternating current to the motor (3) serving as a load, thereby driving the motor (3). The inverter circuit (120) operates with electric power supplied from the alternating-current power source (2).

The inverter circuit (120) includes a circuit main portion (130) and a conversion control unit (140).

The circuit main portion (130) includes a plurality of switching elements, and is configured to convert into a second alternating current the direct current output from the rectifier circuit (110), and supply the second alternating current to the motor (3), by a switching operation of the plurality of switching elements. The circuit main portion (130) includes six switching elements (not shown) and six freewheeling diodes (not shown). The six switching elements are connected in a bridge configuration. That is, the circuit main portion (130) includes three switching legs connected between first and second DC side nodes (130a, 130b). Each switching leg includes two switching elements connected to each other in series.

Each of the three switching legs includes an upper-arm switching element and a lower-arm switching element, and a midpoint between the upper and lower switching elements is connected to a corresponding one of coils of phases (i.e., u-phase, v-phase, or w-phase coils) of the motor (3). The switching elements are connected in antiparallel with the freewheeling diodes, respectively.

The conversion control unit (140) controls the circuit main portion (130). The conversion control unit (140) is configured as a microcomputer. More specifically, the conversion control unit (140) includes a motor control section (141) and a synchronization signal generation section (142) serving as a synchronizer.

The motor control section (141) generates first drive signals (Smd1) for operating the associated switching elements of the circuit main portion (130), using a first carrier wave, so that the motor (3) will rotate at an intended speed, and outputs the generated first drive signals (Smd1) to the switching elements of the circuit main portion (130). The first drive signals (Smd1) include six signals to be supplied to control electrodes of the switching elements associated thereto.

The synchronization signal generation section (142) generates an electrical angle phase signal indicating the electrical angle for rotating the motor (3) at the intended speed. The electrical angle phase signal can be generated by a counter that resets its count value to "0" and starts counting the elapsed time when the output voltage of the circuit main portion (130) switches from negative to positive. The synchronization signal generation section (142) generates a motor phase synchronization signal (Sms) based on the electrical angle phase signal, and transmits the generated motor phase synchronization signal (Sms) to a current control unit (260) of the harmonic reducer (200). The motor phase synchronization signal (Sms) is such that the motor phase synchronization signal (Sms) is at high level while the value of the electrical angle phase signal is within a predetermined numerical value range, whereas the motor phase synchronization signal (Sms) is at low level while the value of the electrical angle phase signal is outside the predetermined numerical value range. Thus, the motor phase synchronization signal (Sms) is a cyclic signal synchronized with the electrical angle of the motor (3), and is also a cyclic signal synchronized with the state of the inverter circuit (120). The motor phase synchronization signal (Sms) is a signal obtained by frequency division of the operation clock of the conversion control unit (140), and is also a control synchronization signal synchronized with the operation clock.

Figure 2:
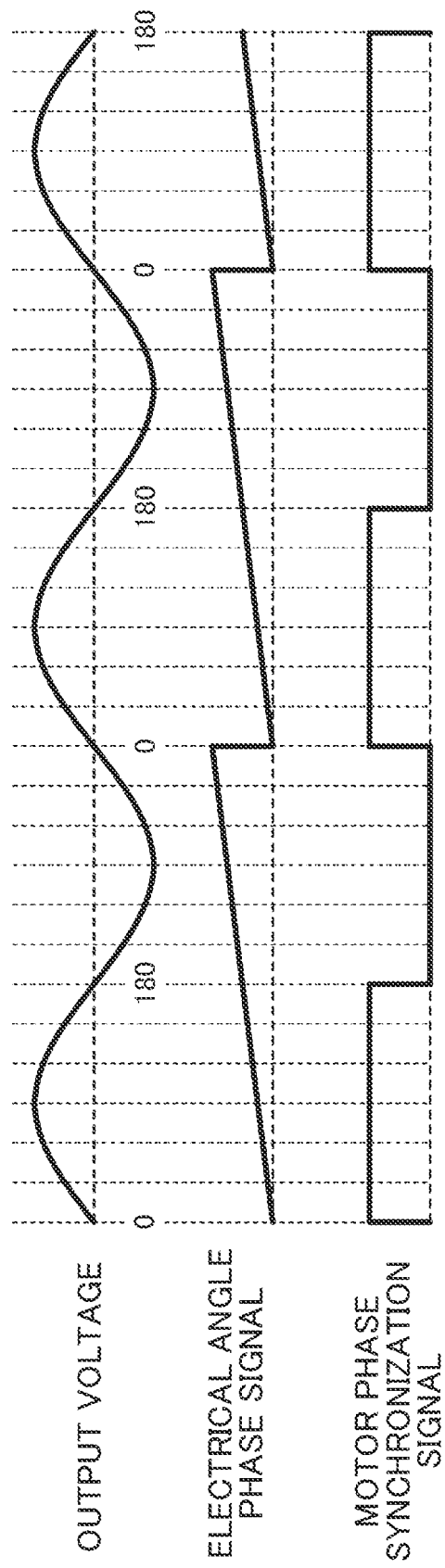
FIG. 2 is a timing chart showing examples of the waveforms of an output voltage, an electrical angle phase signal, and a motor phase synchronization signal of one of three phases of an inverter circuit according to the first embodiment.

FIG. 2 shows examples of the waveforms of the output voltage, the electrical angle phase signal, and the motor phase synchronization signal (Sms) of one of three phases of the inverter circuit (120).

The power converter reactor (150) has one end connected to the first output node (110a) of the rectifier circuit (110), and the other end connected to the first DC side node (130a) of the inverter circuit (120).

The power converter capacitor (160) is connected between the first and second DC side nodes (130a, 130b) of the inverter circuit (120). Thus, the power converter reactor (150) is connected between the alternating-current power source (2) and the power converter capacitor (160).

The capacitance value of the power converter capacitor (160) is set to enable reduction in the ripple voltage resulting from a switching operation of the inverter circuit (120) while allowing fluctuations in the output voltage of the rectifier circuit (11). The ripple voltage is voltage fluctuation fluctuating according to the switching frequency of the switching element. Thus, a DC link voltage which is the voltage of the power converter capacitor (160) contains a ripple component fluctuating according to the frequency of the alternating-current voltage of the alternating-current power source (2).

More specifically, the capacitance of the power converter capacitor (160) is set such that fluctuation in the voltage of the power converter capacitor (160) during a switching cycle is 1/10 or less of the average voltage of the power converter capacitor (160). Thus, the minimum necessary capacitance of the power converter capacitor (160) is determined depending on the switching frequency and on a load current (ii) flowing between the motor (3) and the power converter capacitor (160).

By setting the capacitance value C of the power converter capacitor (160) such that Expression (I) below is satisfied, the fluctuation in the voltage of the power converter capacitor (160) during the switching cycle can be 1/10 or less of the average voltage of the power converter capacitor (160). In Expression (A), fluctuation in the output voltage of the rectifier circuit (110) superimposed on the DC link voltage is ignored, VAdc represents the average value of the DC link voltage, Imax represents the peak value of the load current (ii) obtained at the maximum alternating-current power, and Ts represents the switching cycle.

$$C \geq (10 \cdot Imax \cdot Ts)/VAdc \ldots \quad (I)$$

Here, the switching cycle is a length of intervals at which the switching element is repeatedly turned on and off. In the first embodiment, the switching element is under PWM control. Thus, the switching cycle corresponds to a carrier cycle for a first carrier wave used for the PWM control.

The power converter capacitor (160) is configured as, for example, a film capacitor.

With such a relatively-small capacitance, the power converter capacitor (160) hardly smooths the output voltage of the rectifier circuit (110). As a result, the ripple component fluctuating according to the frequency of the alternating-current power source (2) remains in the DC link voltage. The alternating-current power source (2) is a three-phase power source. Thus, the ripple component fluctuating according to the frequency of the alternating-current power source (2) has a frequency that is six times as high as the frequency of the alternating-current power source (2).

An inductance component between the alternating-current power source (2) and the current conversion unit capacitor (160) and the power converter capacitor (160) form a current conversion unit filter (LC1). The inductance component includes the power converter reactor (150). The capacitance of the current conversion unit capacitor (160) is set such that the current conversion unit filter (LC1) attenuates a first carrier frequency component contained in the current. The first carrier frequency is the frequency of the first carrier wave used for generating a control signal for the circuit main portion (130) of the inverter circuit (120). This configuration can reduce fluctuation in the current flowing between the inverter circuit (120) and the alternating-current power source, the fluctuation fluctuating according to the first carrier frequency due to the switching operation of the inverter circuit (120).

The harmonic reducer (200) is connected to the alternating-current power source (2) in parallel with the power converter (100). The harmonic reducer (200) performs control to reduce the harmonic current flowing to the alternating-current power source (2).

Figure 3:
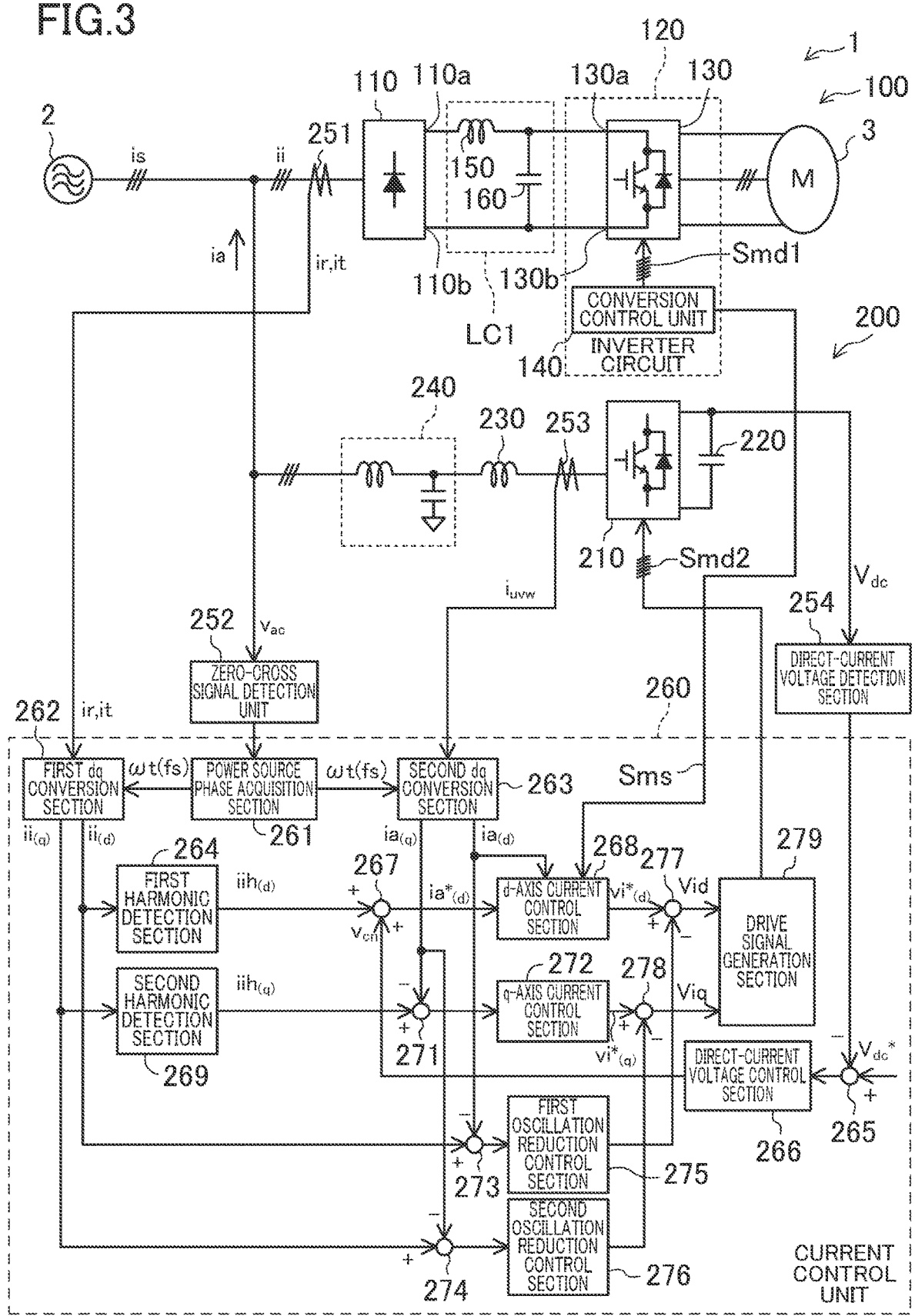
FIG. 3 is a block diagram illustrating a configuration of a current control unit in detail according to the first embodiment.

As shown also in FIG. 3, the harmonic reducer (200) includes a current formation unit (210), a harmonic reducer capacitor (220), interconnection reactors (230) for the respective phases, harmonic reducer filters (240) for the respective phases, a load current detection unit (251), a zero-cross signal detection unit (252) serving as a zero-cross circuit, a control target current detection section (253), a direct-current voltage detection section (254), and the current control unit (260). In FIG. 1, the load current detection unit (251), the zero-cross signal detection unit (252), the control target current detection section (253), and the direct-current voltage detection section (254) are not shown.

Figure 4:
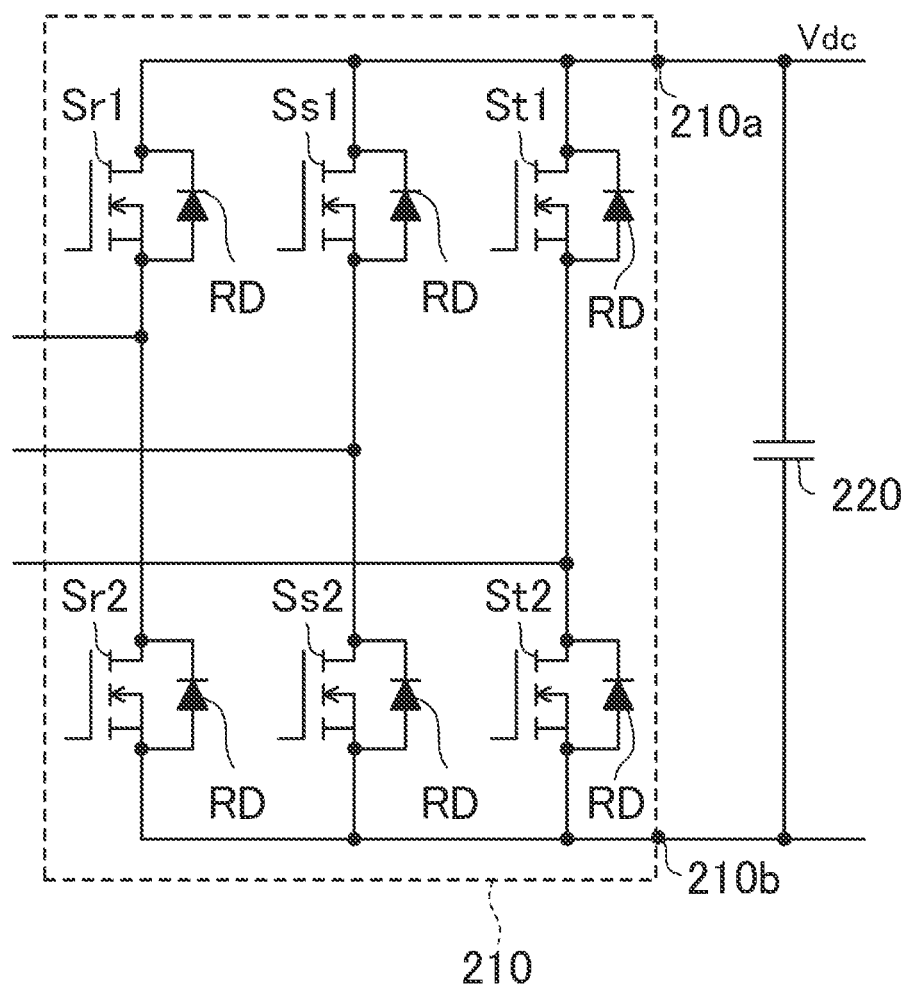
FIG. 4 is a circuit diagram of a current formation unit according to the first embodiment.

The current formation unit (210) forms a current flowing to the alternating-current power source (2). As shown in FIG. 4, the current formation unit (210) includes six switching elements (Sr1, Sr2, Ss1, Ss2, St1, St2) and six freewheeling diodes (RD). The switching elements (Sr1, Sr2, Ss1, Ss2, St1, St2) are a unipolar transistor, and are a metal oxide semiconductor field effect transistor (MOSFET) made of a wide-bandgap semiconductor material as a main material. The current formation unit (210) includes switching legs connected between first and second DC side nodes (210a, 210b) thereof for the respective phase of the alternating-current power source (2). Each switching leg includes a pair of switching elements (Sr1, Sr2, Ss1, Ss2, St1, St2) connected to each other in series.

Each of the three switching legs includes an upper-arm switching element (Sr1, Ss1, St1) and a lower-arm switching element (Sr2, Ss2, St2), and a midpoint between the upper and lower-arm switching elements is an alternating-current-side node. The switching elements (Sr1, Sr2, Ss1, Ss2, St1, St2) are connected in antiparallel with the freewheeling diodes (RD), respectively.

The harmonic reducer capacitor (220) is connected between the DC side nodes (210a, 210b) of the current formation unit (210). Thus, the harmonic reducer capacitor (220) is connected to the DC side of the current formation unit (210). The capacitance of the harmonic reducer capacitor (220) is greater than the capacitance of the power converter capacitor (160).

One end of the interconnection reactor (the u-phase, v-phase, or w-phase interconnection reactor) (230) of each phase is connected to corresponding one of the alternating-current-side nodes of the current formation unit (210). The other end of each interconnection reactor (230) is connected to the alternating-current power source (2) via a corresponding one of the harmonic reducer filters (240). That is, the interconnection reactors (230) are connected between the alternating-current power source (2) and one end of the harmonic reducer capacitor (220). Thus, the current formation unit (210) is connected to the alternating-current power source (2) via the interconnection reactors (230).

The harmonic reducer filter (240) of each phase is interposed between the alternating-current power source (2) and a corresponding one of the interconnection reactors (230). Each harmonic reducer filter (240) has a filter reactor (241) having a smaller inductance than that of the interconnection reactor (230), and a filter capacitor (242).

The load current detection unit (251) detects currents ($i_r$, $i_t$) of two phases proportional to two of the phases of load currents (ii) flowing from the alternating-current power source (2) toward the power converter (10).

The zero-cross signal detection unit (252) detects that one of three phases of the power-source voltage ($v_{ac}$) output by the alternating-current power source (2) has passed through the zero-cross point, and outputs a zero-cross signal corresponding to the detection result. For example, the zero-cross signal is such that the zero-cross signal rises to high level when the power-source voltage ($v_{ac}$) switches from negative to positive, whereas the zero-cross signal falls to low level when the power-source voltage ($v_{ac}$) switches from positive to negative.

The control target current detection section (253) detects output currents ($i_{uvw}$) of three phases output by the current formation unit (210). The output currents ($i_{uvw}$) are proportional to a compensating current (ia) flowing from a current compensation unit (20) to the alternating-current power source (2).

The direct-current voltage detection unit (254) detects the output voltage between the DC side nodes (210a, 210b) of the current formation unit (210), i.e., the voltage ($v_{dc}$) of the harmonic reducer capacitor (220).

The current control unit (260) controls the current formation unit (210) through a second drive signal (Smd2) to reduce the harmonic current flowing to the alternating-current power source (2). The current control unit (260) is configured as a microcomputer different from that of the conversion control unit (140). More specifically, the current control unit (260) includes a power source phase acquisition section (261), first and second dq conversion sections (262, 263), a first harmonic detection section (264), a first subtraction section (265), a direct-current voltage control section (266), a first addition section (267), a d-axis current control section (268), a second harmonic extraction section (269), a second subtraction section (271), a q-axis current control section (272), third and fourth subtraction sections (273, 274), first and second oscillation reduction control sections (275, 276), fifth and sixth subtraction sections (277, 278), and a drive signal generation section (279).

Based on the zero-cross signal output by the zero-cross signal detection unit (252), the power source phase acquisition section (261) estimates a power source phase signal (ωt(fs)) synchronized with the power-source voltage ($v_{ac}$) output by the alternating-current power source (2). The power source phase signal (ωt(fs)) indicates the count value of a counter that resets its count value to "0" and starts counting the elapsed time when the power-source voltage ($v_{ac}$) switches from negative to positive, i.e., the power source phase signal (ωt(fs)) indicates the phase of the power-source voltage ($v_{ac}$). The power source phase signal (ωt(fs)) is estimated based on the zero-cross signal. The power source phase signal (ωt(fs)) is estimated through correction of the zero-cross signal for a predetermined phase error. The predetermined phase error is set based on estimation carried out in advance. If the phase error is ignorable, or if a configuration in which the zero-cross signal that has been corrected for the phase error is input to the power source phase acquisition section (261) is employed, it may be so configured that the power source phase acquisition section (261) resets, without performing the correction, the zero-cross signal to "0" when the zero-cross signal switches from low level to high level, and the power source phase acquisition section (261) detects, as the power source phase signal (ωt(fs)), a signal that increases the signal value thereof in proportion to the elapsed time.

Based on currents ($i_r$, $i_t$) of two phases proportional to the load current (ii), the first dq conversion section (262) calculates a current ($i_s$) of the remaining one phase, and obtains a d-axis component (ii(d)) and a q-axis component (ii(q)) of the load current (ii) by three-phase/two-phase conversion of currents ($i_{rst}$) of three phases. The d-axis and the q-axis are coordinate axes of a rotating coordinate system synchronized with the phase indicated by the power source phase signal (ωt(fs)). The d-axis component (ii(d)) is an active component, and the q-axis component (ii(q)) is a reactive component. The load current (ii) has three phases, and therefore, if the currents ($i_r$, $i_t$) proportional to the load currents (ii) of two phases can be detected, the d-axis component (ii(d)) and the q-axis component (ii(q)) of the load current (ii) can be worked out.

The second dq conversion section (263) performs three-phase/two-phase conversion of the output currents ($i_{uvw}$) detected by the control target current detection section (253) to obtain a d-axis component (ia(d)) and a q-axis component (ia(q)) of the compensating current (ia). Just like the load current (ii), the output current ($i_{uvw}$) has three phases, and therefore, if the currents proportional to the output currents of two phases can be detected, the d-axis component (ia(d)) and the q-axis component (ia(q)) of the compensating current (ia) can be obtained.

The first harmonic detection section (264) is a high-pass filter that filters the load current (ii) obtained by the first dq conversion section (262), so as to output a high-frequency component (iih(d)) of the d-axis component (ii(d)) thereof.

The first subtraction section (265) subtracts, from an output voltage command value (Vdc*), the output voltage between the DC side nodes (210a, 210b) of the current formation unit (210), i.e., the voltage ($v_{dc}$) of the harmonic reducer capacitor (220), and outputs the subtraction result.

The direct-current voltage control section (266) performs proportional integral control on the subtraction result output from the first subtraction section (265), thereby to obtain a correction value (Vcn).

The first addition section (267) adds up the high-frequency component (iih(d)) of the d-axis component output from the first harmonic detection section (264) and the correction value (Vcn) obtained by the direct-current voltage control section (266), and outputs the addition result as a command value (ia*(d)) for the d-axis component.

Figure 5:
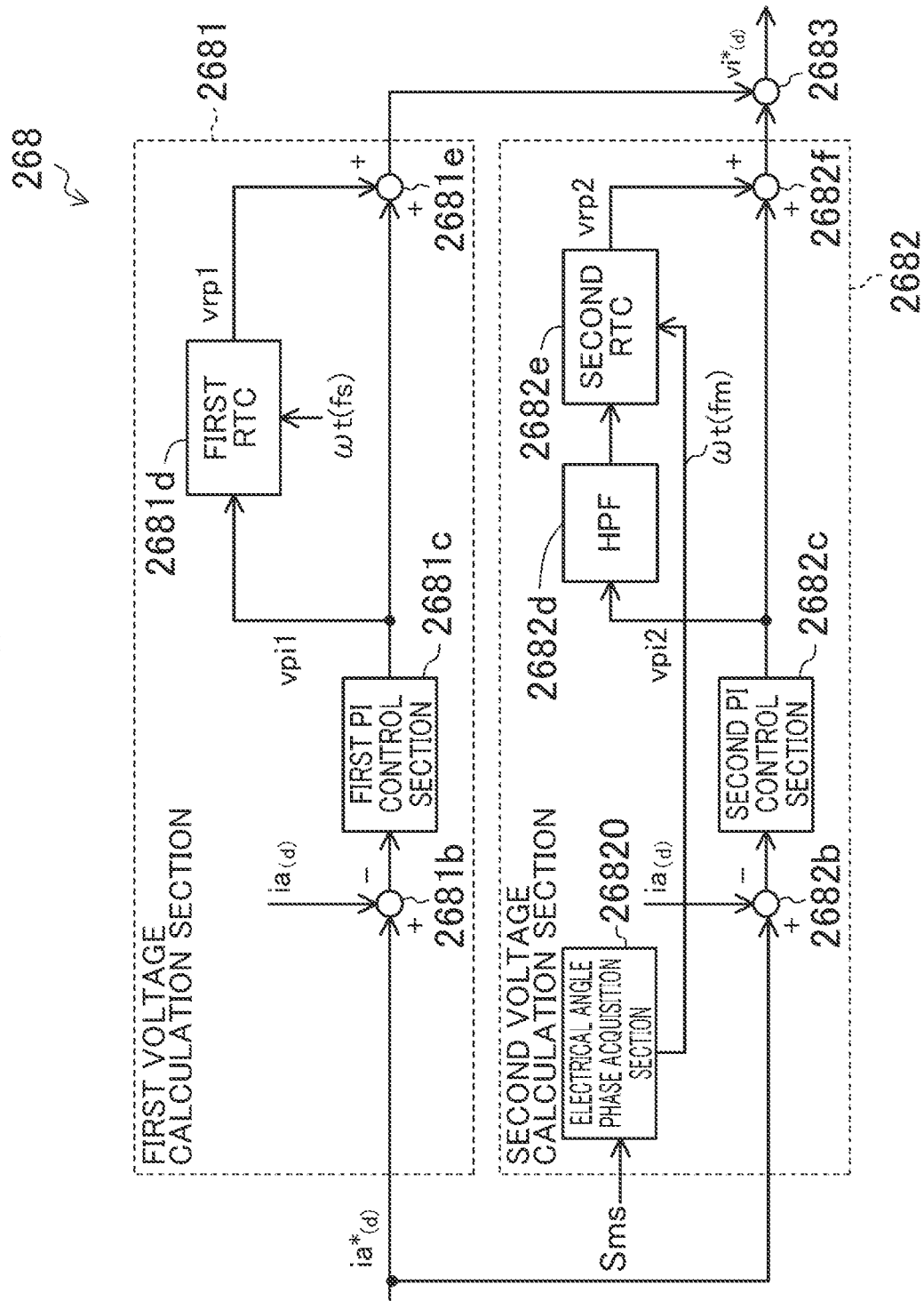
FIG. 5 is a block diagram illustrating a configuration of a d-axis current control section in detail according to the first embodiment.

As illustrated in FIG. 5, the d-axis current control section (268) includes a first voltage calculation section (2681), a second voltage calculation section (2682), and a second addition section (2683).

The first voltage calculation section (2681) calculates out a first voltage command value based on the power source phase signal (ωt(fs)) in such a way as to reduce the harmonic component, which is included in the harmonic current flowing to the alternating-current power source (2) and which results from the cycle of the power-source voltage ($v_{ac}$). The first voltage calculation section (2681) includes a seventh subtraction section (2681b), a first PI control section (2681c), a first repetitive control (RTC) (2681d), and a third addition section (2681e).

The seventh subtraction section (2681b) subtracts, from the command value (ia*(d)) of the d-axis component output from the first addition section (267), the d-axis component (ia(d)) of the compensating current (ia) obtained by the second dq conversion section (263), and outputs the subtraction result.

The first PI control section (2681c) works out the sum of a value obtained by multiplying the subtraction result output from the seventh subtraction section (2681b) by a first gain and a value obtained by integrating the subtraction result and multiplying the integrated subtraction result by a second gain, and outputs the sum as a first control value (Vpi1).

The first RTC (2681d) has N storage sections, and the storage sections correspond to different phases shifted from each other by 2π/N. Each storage section receives the first control value (Vpi1) every time the phase of the power-source voltage ($v_{ac}$) is the phase corresponding to the storage section. The first RTC (2681d) can identify the phase of the power-source voltage ($v_{ac}$) based on the power source phase signal (ωt(fs)). Each storage section adds the received value (the first control value (Vpi1) at the present sampling time) to the stored value already stored therein, so as to obtain a cumulative value, which is now its new stored value. In accordance with the phase of the power-source voltage ($v_{ac}$), the first RTC (2681d) selects that one of the stored values stored in the N storage sections that corresponds to the phase of the power-source voltage ($v_{ac}$), so that all of these stored values will be selected in one cycle of the power-source voltage ($v_{ac}$), and outputs the selected value as a first cumulative value (Vrp1).

The third addition section (2681e) adds up the first control value (Vpi1) output from the first PI control section (2681c) and the first cumulative value (Vrp1) output from the first RTC (2681d), and outputs the addition result as the first voltage command value.

The second voltage calculation section (2682) calculates a second voltage command value based on the motor phase synchronization signal (Sms) to reduce the harmonic component, which is included in the harmonic current flowing to the alternating-current power source (2) and which results from the rotation of the motor (3). The second voltage calculation section (2682) includes an electrical angle phase acquisition section (26820), an eighth subtraction section (2682b), a second PI control section (2682c), a high-pass filter (HPF) (2682d), a second repetitive control (RTC) (2682e), and a fourth addition section (2682f).

The electrical angle phase acquisition section (26820) generates an electrical angle phase signal (ωt(fm)) indicating the phase of the electrical angle of the motor (3) based on the motor phase synchronization signal (Sms) generated by the conversion control unit (140) of the power converter (100).

The eighth subtraction section (2682*b*) subtracts, from the command value (ia*(d)) of the d-axis component output from the first addition section (267), the d-axis component (ia(d)) of the compensating current (ia) obtained by the second dq conversion section (263), and outputs the subtraction result.

The second PI control section (2682*c*) obtains the sum of a value obtained by multiplying the subtraction result output from the eighth subtraction section (2682*b*) by the first gain and a value obtained by integrating the subtraction result and multiplying the integrated subtraction result by the second gain, and outputs the sum as a second control value (Vpi2).

The high-pass filter (2682*d*) outputs a high-frequency component of the second control value (Vpi2).

The second RTC (2682*e*) has N storage sections, and the storage sections correspond to different phases shifted by 2π/N. Each storage unit receives a high-frequency component of the second control value (Vpi2) every time the phase of the electrical angle of the motor (3) is the phase corresponding to the storage unit. The second RTC (2682*e*) can identify the phase of the electrical angle of the motor (3) based on the electrical angle phase signal (ωt(fm)). Each storage unit adds the received value (the high-frequency component of the second control value (Vpi2) at the present sampling time) to the stored value already stored therein, so as to obtain a cumulative value, which is now its new stored value. In accordance with the phase of rotation of the motor (3), the second RTC (2682*e*) selects that one of the stored values stored in the N storage units that corresponds to with the phase of rotation of the motor (3), so that all of these stored values will be selected in one cycle of rotation of the motor (3), and outputs the selected value as a second cumulative value (Vrp2).

The fourth addition section (2682*f*) adds up the second control value (Vpi2) output from the second PI control section (2682*c*) and the second cumulative value (Vrp2) output from the second RTC (2682*e*), and outputs the addition result as the second voltage command value.

The first voltage calculation section (2681) and the second voltage calculation section (2682) calculate the first voltage command value and the second voltage command value, respectively, in parallel.

The second addition section (2683) adds up the first voltage command value calculated by the first voltage calculation section (2681) and the second voltage command value calculated by the second voltage calculation section (2682), and outputs the addition result as an output voltage command value (vi*(d)) of the d-axis component.

The first and second voltage calculation sections (2681, 2682) may be configured to share a subtraction section commonly serving as the seventh and eighth subtraction sections (2681*b*, 2682*b*). Optionally, the first and second voltage calculation sections (2681, 2682) may be configured to share a PI control unit commonly serving as the first and second PI control sections (2681*c*, 2682*c*).

The second harmonic extraction section (269) is a high-pass filter that outputs a high-frequency component (iih(q)) of the q-axis component (ii(d)) of the load current (ii) obtained by the first dq conversion section (262).

The second subtraction section (271) subtracts, from the high-frequency component (iih(q)) of the q-axis component (ii(q)), the q-axis component (ia(q)) of the compensating current (ia) obtained by the second dq conversion section (263), and outputs the subtraction result.

The q-axis current control section (272) generates the output voltage command value (vi*(q)) for the q-axis component such that the subtraction result output from the second subtraction section (271) will decrease. The q-axis current control section (272) generates the output voltage command value (vi*(q)) for the q-axis component by proportional integral control, for example.

The third subtraction section (273) subtracts, from the d-axis component (ii(d)) of the load current (ii) obtained by the first dq conversion section (262), the d-axis component (ia(d)) of the compensating current (ia) obtained by the second dq conversion section (263), and thus outputs a component corresponding to the d-axis component of the power-source current (is).

The fourth subtraction section (274) subtracts, from the q-axis component (ii(q)) of the load current (ii) obtained by the first dq conversion section (262), the q-axis component (ia(q)) of the compensating current (ia) obtained by the second dq conversion section (263), and thus outputs a component corresponding to the q-axis component of the power-source current (is).

The first oscillation reduction control section (275) outputs an oscillation reduction signal, based on the subtraction result output from the third subtraction section (273), to reduce oscillations. More specifically, the first oscillation reduction control section (275) calculates a second derivative of the subtraction result output from the third subtraction section (273), and multiplies the second derivative by a predetermined oscillation reduction control gain (k2), thereby obtaining an oscillation reduction signal.

The second oscillation reduction control section (276) outputs an oscillation reduction signal, based on the subtraction result output from the fourth subtraction section (274), to reduce oscillations. More specifically, the second oscillation reduction control section (276) calculates a second derivative of the subtraction result output from the fourth subtraction section (274), and multiplies the second derivative by the predetermined oscillation reduction control gain (k2), thereby obtaining an oscillation reduction signal.

A method for generating an oscillation reduction signal using the first and second oscillation reduction control sections (275, 276) is disclosed in detail in Japanese Unexamined Patent Publication No. 2016-116330.

The fifth subtraction section (277) subtracts the output of the first oscillation reduction control section (275) from the output voltage command value (vi*(d)) of the d-axis component output from the second addition section (2683) of the d-axis current control section (268), and outputs the subtraction result as the output voltage command value (Vid) of the d-axis component.

The sixth subtraction section (278) subtracts the output of the second oscillation reduction control section (276) from the output voltage command value (vi*(q)) of the q-axis component output from the q-axis current control section (272), and outputs the subtraction result as the output voltage command value (Viq) of the q-axis component.

The drive signal generation section (279) generates the drive signal (Smd2) for driving the switching elements (Sr1, Sr2, Ss1, Ss2, St1, St2), based on the output voltage command values (Vid, Viq) respectively output from the fifth and sixth subtraction sections (277, 278). A method for generating the drive signal (Smd2) based on the output voltage command values (Vid, Viq) is well-known, and thus the description thereof is omitted herein.

In a configuration in which the conversion control unit (140) simply delivers the rotation cycle of the motor (3) to the current control unit (260) by inter-microcomputer communication, the delivery takes time before reaching to the current control unit (260). Therefore, if a time error occurs between the operation clocks of the conversion control unit (140) and current control unit (260), the current control unit (260) cannot correctly recognize the rotation cycle, and, therefore, cannot adequately compensate for the harmonic component resulting from the rotation of the motor (3). However, according to the first embodiment, the current control unit (260) performs control in synchronization with the motor phase synchronization signal (Sms). Thus, the harmonic component resulting from the rotation of the motor (3) can be more effectively compensated for. More specifically, the second voltage calculation section (2682) of the current control unit (260) may be configured to calculate the second voltage command value in synchronization with the operation of the conversion control unit (140) by referring to the motor phase synchronization signal (Sms). In this way, the state of the inverter circuit (120) can be synchronized with the state of the harmonic reducer (200).

The motor phase synchronization signal (Sms) is a cyclic signal. Thus, the second voltage calculation section (2682) of the current control unit (260) operating in synchronization with the motor phase synchronization signal (Sms) can operate cyclically in synchronization with the conversion control unit (140).

The motor phase synchronization signal (Sms) is transmitted to the harmonic reducer (200). Thus, the current control unit (260) of the harmonic reducer (200) can accurately grasp the rotation cycle of the motor (3) even if the harmonic reducer (200) is not provided with a means for detecting the motor phase synchronization signal (Sms).

The current control unit (260) controls the current formation unit (210) based on the first and second voltage command values. This can effectively reduce the harmonic component that results from the cycle of the power-source voltage ($v_{ac}$) and the harmonic component that results from the rotation of the motor (3), the harmonic components being both included in the harmonic current that flows to the alternating-current power source (2).

The first voltage calculation section (2681) and the second voltage calculation section (2682) calculate the first voltage command value and the second voltage command value, respectively, in parallel. Thus, operations for calculating the first and second voltage command values do not interfere with each other.

The main material of the switching elements (Sr1, Sr2, Ss1, Ss2, St1, St2) of the current formation unit (210) is a wide bandgap semiconductor. This allows the switching elements (Sr1, Sr2, Ss1, Ss2, St1, St2) to perform a switching operation at a high frequency. This can effectively reduce the harmonic current that flows to the alternating-current power source (2).

First Variation of First Embodiment

Figure 6:
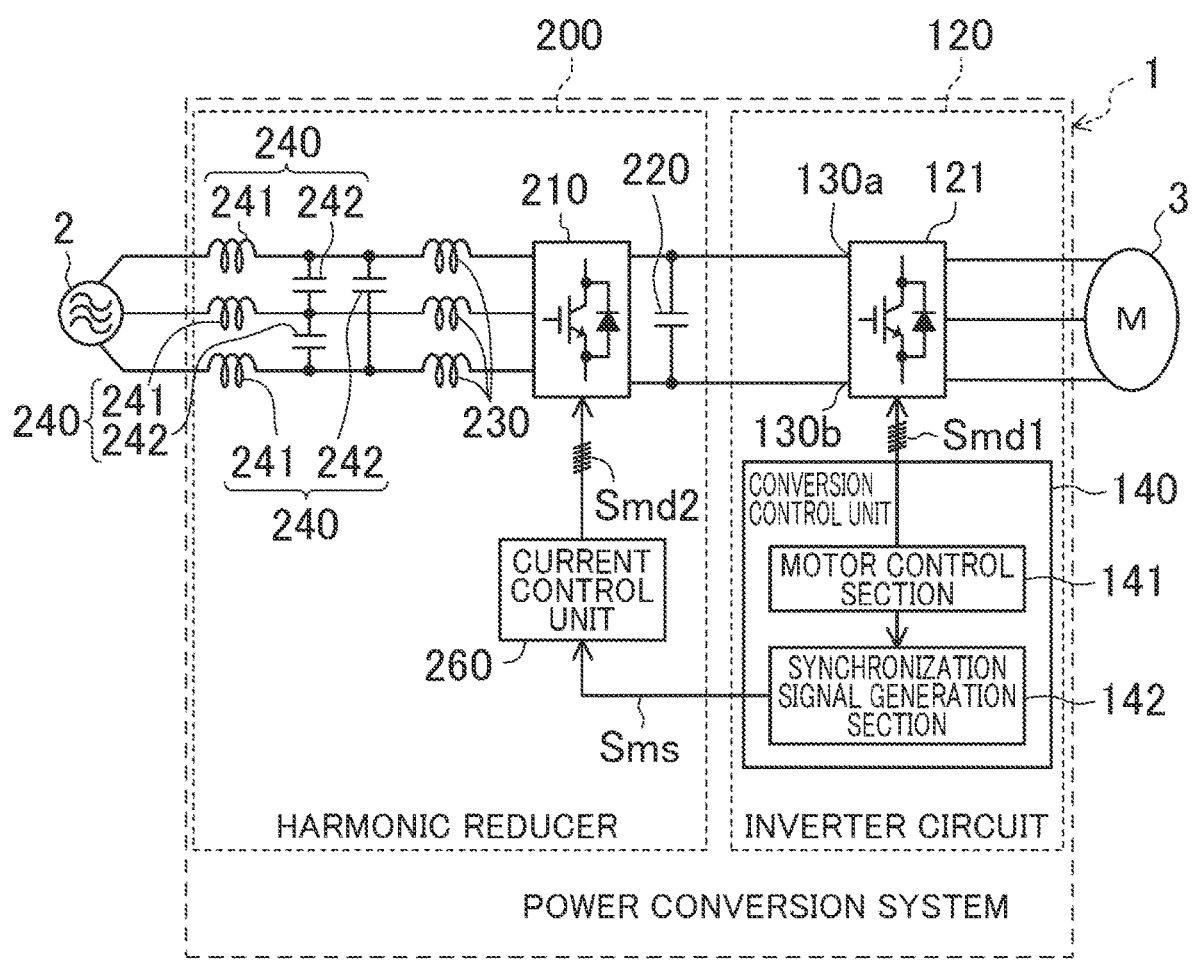
FIG. 6 illustrates a first variation of the first embodiment, corresponding to FIG. 1.
Figure 7:
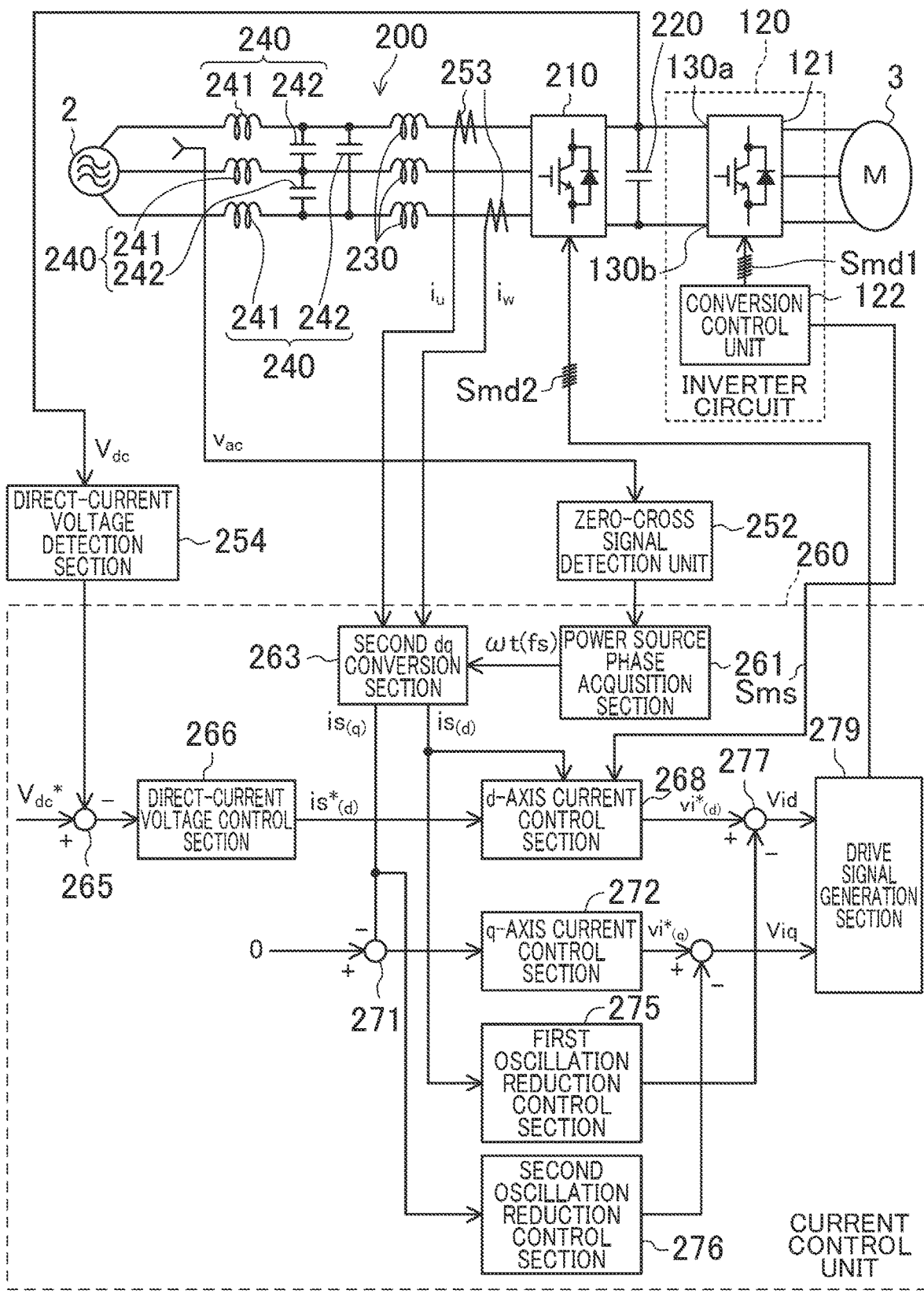
FIG. 7 illustrates the first variation of the first embodiment, corresponding to FIG. 3.
Figure 8:
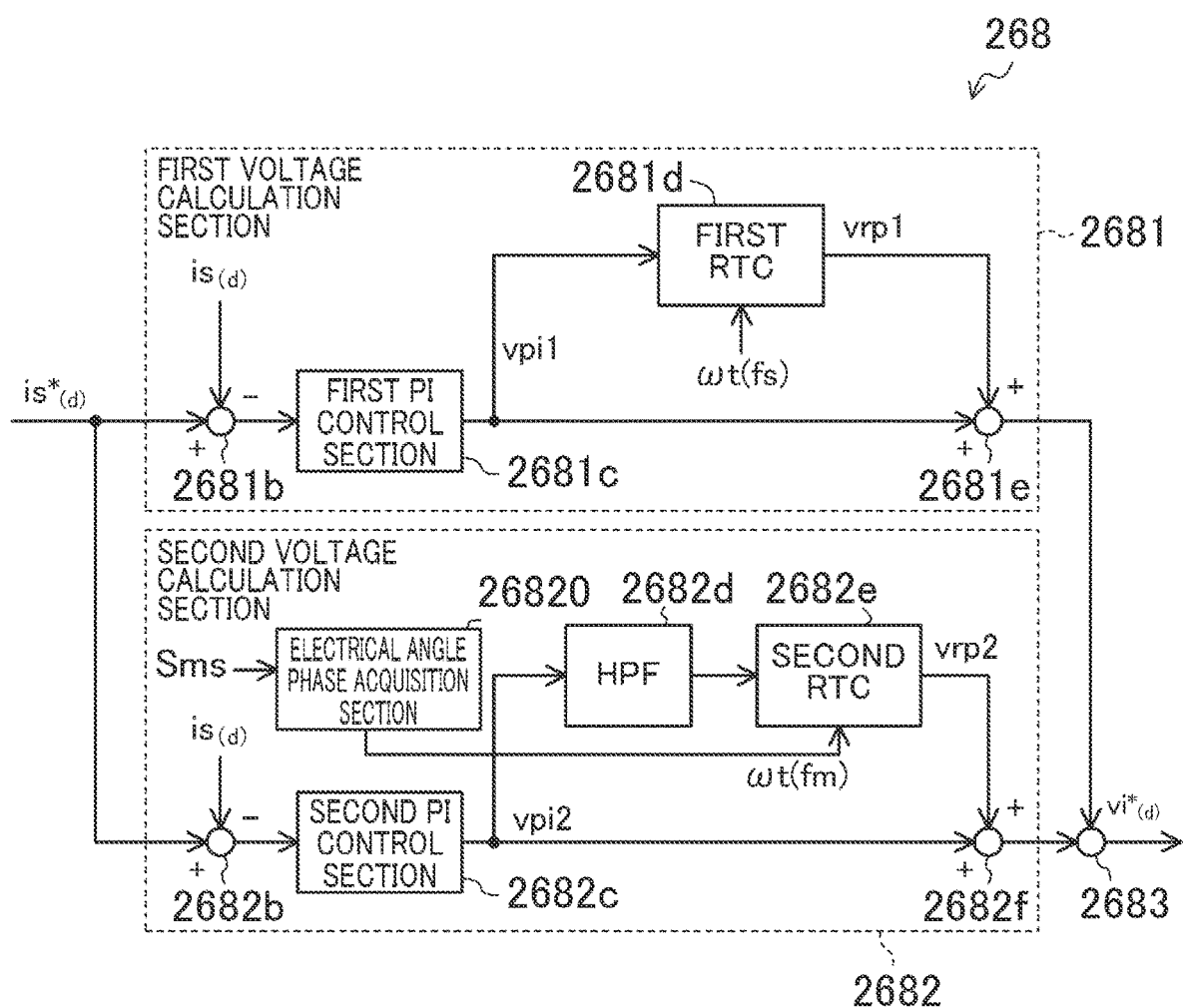
FIG. 8 illustrates the first variation of the first embodiment, corresponding to FIG. 5.

FIGS. 6 and 7 show a power conversion system (1) according to a first variation of the first embodiment of the present disclosure. In the first variation, the harmonic reducer (200) is connected in series to the DC side of the inverter circuit (120). More specifically, the harmonic reducer capacitor (220) is connected between the first and second DC side nodes (130a, 130b).

The harmonic reducer (200) does not include the load current detection unit (251).

The control target current detection section (253) detects two of three phases of the output currents ($i_{uvw}$) output from the current formation unit (210), i.e., the output currents ($i_u$, $i_w$).

The current control unit (260) does not include the first dq conversion section (262), the first harmonic detection section (264), and the first addition section (267).

The second dq conversion section (263) calculates the output current (iv) of the remaining one phase based on the output currents ($i_u$, $i_w$) of the two phases detected by the control target current detection sections (253), and performs three-phase/two-phase conversion of the output currents ($i_{uvw}$) of the three phases to obtain a d-axis component (is(d)) and a q-axis component (is(q)) of the power-source current (is) output from the alternating-current power source (2).

The direct-current voltage control section (266) performs proportional integral control on the subtraction result output from the first subtraction section (265), thereby to obtain a command value (is*(d)) for the d-axis component of the power-source current (is).

The seventh subtraction section (2681b) of the first voltage calculation section (2681) subtracts, from the command value (is*(d)) for the d-axis component obtained by the direct-current voltage control section (266), the d-axis component (is(d)) of the power-source current (is) obtained by the second dq conversion section (263).

The eighth subtraction section (2682b) of the second voltage calculation section (2682) subtracts, from the command value (is*(d)) for the d-axis component obtained by the direct-current voltage control section (266), the d-axis component (is(d)) of the power-source current (is) obtained by the second dq conversion section (263).

The second subtraction section (271) subtracts, from "0," the q-axis component (is(q)) of the power-source current (is) obtained by the second dq conversion section (263).

The other configurations of this embodiment are the same as, or similar to, those of the first embodiment. Thus, the like reference characters are used to indicate the like components, and their detailed description will not be repeated herein.

The first and second voltage calculation sections (2681, 2682) may be configured to share a subtraction section commonly serving as the seventh and eighth subtraction sections (2681b, 2682b). Optionally, the first and second voltage calculation sections (2681, 2682) may be configured to share a PI control unit commonly serving as the first and second PI control sections (2681c, 2682c).

SECOND EMBODIMENT

Figure 9:
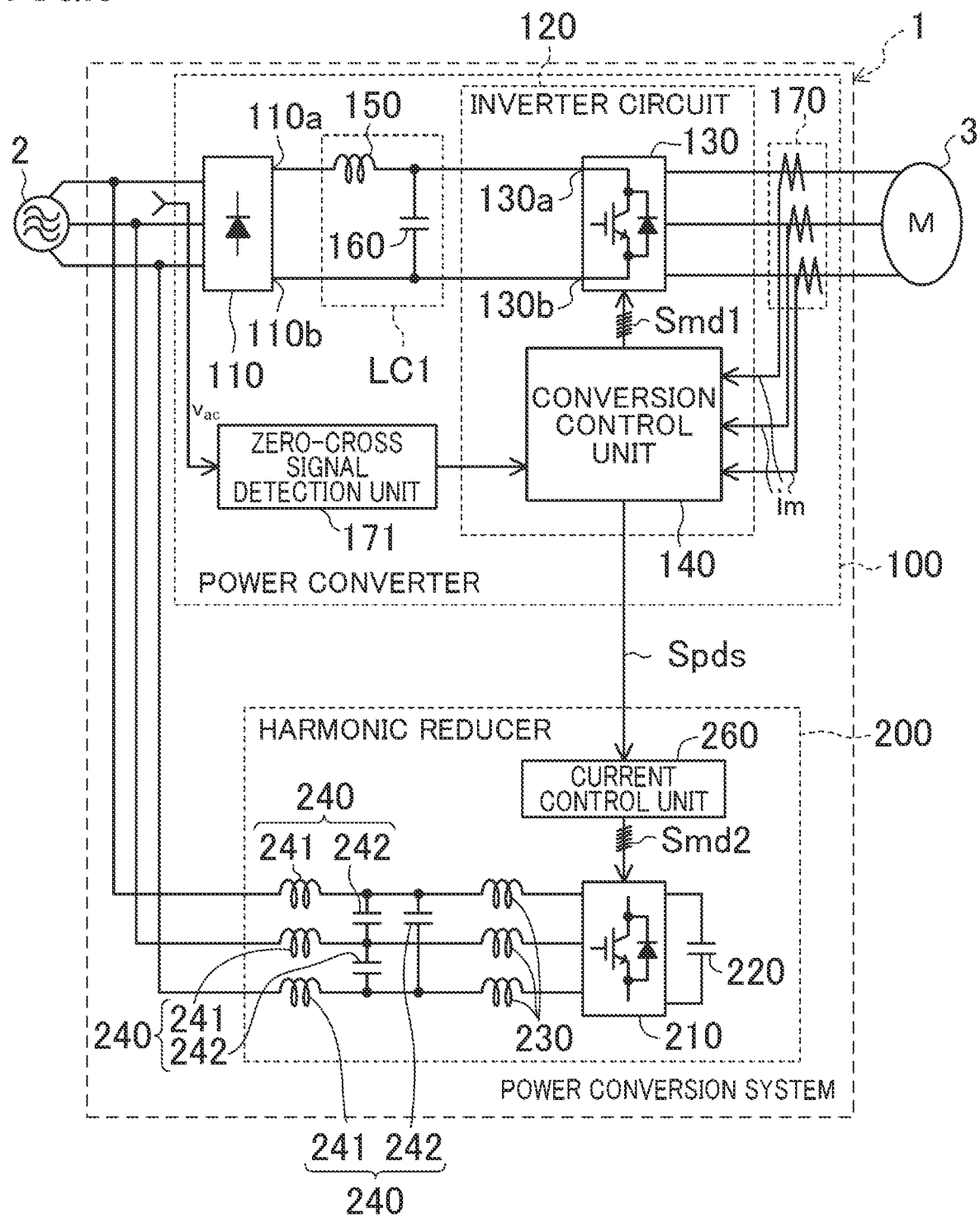
FIG. 9 illustrates a second embodiment, corresponding to FIG. 1.

FIG. 9 shows a power conversion system (1) according to a second embodiment of the present disclosure. In the second embodiment, a power converter (100) further includes a motor current detection unit (170). The power converter (100) is provided with a zero-cross signal detection unit (171), and a harmonic reducer (200) is not provided with a zero-cross signal detection unit (252).

The zero-cross signal detection unit (171) outputs a zero-cross signal based on one of three phases of the power-source voltages ($v_{ac}$) output from the alternating-current power source (2). For example, the zero-cross signal is such that the zero-cross signal rises to high level when the power-source voltage ($v_{ac}$) switches from negative to positive, whereas the zero-cross signal falls to low level when the power-source voltage ($v_{ac}$) switches from positive to negative.

The motor current detection unit (170) detects motor currents ($i_m$) output from a circuit main portion (130) of an inverter circuit (120).

Figure 10:
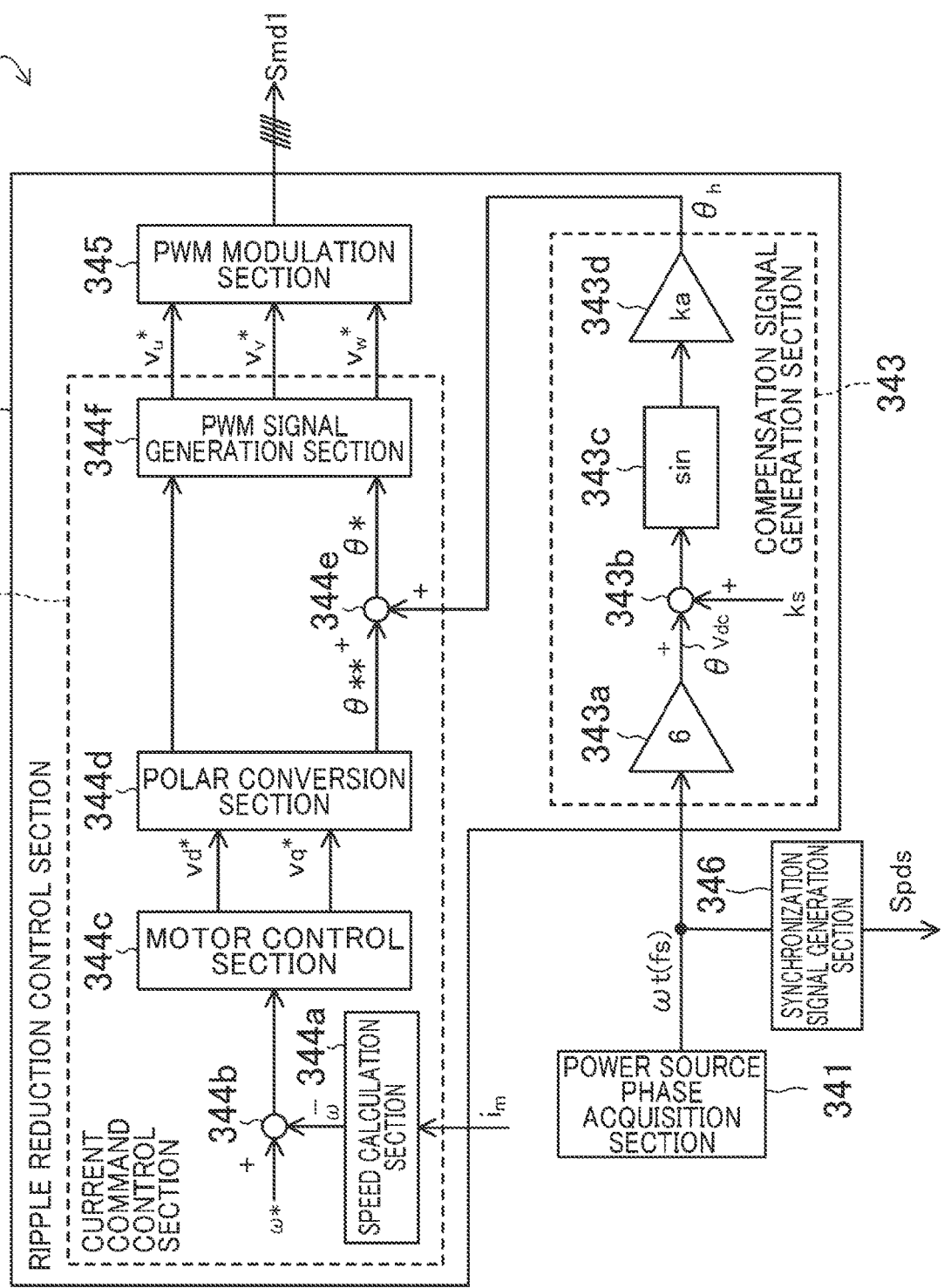
FIG. 10 is a block diagram illustrating a detailed configuration of a conversion control unit according to the second embodiment.

As shown in FIG. 10, a conversion control unit (140) includes a power source phase acquisition section (341), a ripple reduction control section (342), and a synchronization signal generation section (346) serving as a synchronizer.

The power source phase acquisition section (341) estimates a power source phase signal (ωt(fs)) synchronized with the power-source voltage ($v_{ac}$) output from the alternating-current power source (2), based on the zero-cross signal output from the zero-cross signal detection unit (171). Just like the power source phase acquisition section (261) of the first embodiment, if the phase error is ignorable, or if a configuration in which the zero-cross signal that has been corrected for the phase error is input to the power source phase acquisition section (341) is employed, it may be so configured that the power source phase acquisition section (341) resets, without performing the correction, the zero-cross signal to "0" when the zero-cross signal switches from low level to high level, and the power source phase acquisition section (341) detects, as the power source phase signal (ωt(fs)), a signal that increases the signal value thereof in proportion to the elapsed time.

The ripple reduction control section (342) controls the circuit main portion (130) based on the power source phase signal (ωt(fs)) acquired by the power source phase acquisition section (341) to reduce the ripple component of frequency, which is included in the voltage between the DC side nodes (130a, 130b) of the inverter circuit (120) and which results from the cycle of the power-source voltage ($v_{ac}$).

The ripple reduction control section (342) includes a compensation signal generation section (343), a current command control section (344), and a PWM modulation section (345).

The compensation signal generation section (343) includes a frequency multiplication section (343a) that performs frequency multiplication on the power source phase signal (ωt(fs)), an addition section (343b), a sine-wave conversion section (343c), and a multiplication section (343d).

The frequency multiplication section (343a) multiplies the power source phase signal (ωt(fs)) by six, and thus obtains and outputs a signal ($\theta_{Vdc}$) representing the phase of the ripple component of the DC link voltage.

The addition section (343b) adds the phase correction amount ($k_s$) (a fixed value) to the signal ($\theta_{Vdc}$) output from the frequency multiplication section (343a), and outputs the addition result.

The sine-wave conversion section (343c) converts, into a sine wave, the addition result output from the addition section (343b), and outputs the sine wave.

The multiplication section (343d) multiplies the sine wave output from the sine-wave conversion section (343c) by a predetermined gain correction amount ($k_a$) (a fixed value), and thus obtains and outputs a compensation signal ($\theta_h$).

The current command control section (344) includes a speed calculation section (344a), a subtraction section (344b), a motor control section (344c), a polar conversion section (344d), an addition section (344e), and a PWM signal generation section (344f).

The speed calculation section (344a) calculates the actual speed (ω) of a motor (3) based on the motor currents (im) detected by the motor current detection unit (170).

The subtraction section (344b) subtracts, from a speed command (ω*) for the motor (3), the actual speed (ω) calculated by the speed calculation section (344a), and outputs the subtraction result.

The motor control section (344c) outputs voltage commands (vd*, vq*) based on the subtraction result output from the subtraction section (344b).

The polar conversion section (344d) converts, into polar coordinates, the voltage commands (vd*, vq*) output from the motor control section (344c), to acquire a voltage amplitude command (v*) and a voltage phase command (θ**).

The addition section (344e) adds the compensation signal ($\theta_h$) output from the compensation signal generation section (343) to the voltage phase command (θ**) acquired by the polar conversion section (344d), and outputs the addition result as a voltage phase command (θ*).

The PWM signal generation section (344f) outputs phase voltage command signals (Vu*, Vv*, Vw*) based on the voltage amplitude command (v*) acquired by the polar conversion section (344d) and the voltage phase command (θ*) output from the addition section (344e).

The PWM modulation section (345) outputs a first drive signal (Smd1) for operating switching elements of a circuit main portion (130), based on the phase voltage command signals (Vu*, Vv*, Vw*) output from the PWM signal generation section (344f).

The synchronization signal generation section (346) generates a power source phase synchronization signal (Spds) as a synchronization signal, based on the power source phase signal (ωt(fs)) estimated by the power source phase acquisition section (341), and transmits the synchronization signal to a current control unit (260) of the harmonic reducer (200). The power source phase synchronization signal (Spds) is such that the power source phase synchronization signal (Spds) is at high level while the power source phase signal (ωt(fs)) is a value equivalent to a phase of 0° to 180°, whereas the power source phase synchronization signal (Spds) is at low level while the power source phase signal (ωt(fs)) is a value equivalent to a phase of 180° to 360°. The power source phase synchronization signal (Spds) is a signal synchronized with the power-source voltage ($v_{ac}$) output from the alternating-current power source (2). The power source phase synchronization signal (Spds) is obtained by frequency division of the operation clock of the conversion control unit (140), and is a control synchronization signal synchronized with the operation clock.

A power source phase acquisition section (261) of the current control unit (260) of the harmonic reducer (200) estimates the power source phase signal (ωt(fs)) synchronized with the power-source voltage ($v_{ac}$) output from the alternating-current power source (2), based on the power source phase synchronization signal (Spds) generated by the synchronization signal generation section (346). Thus, the current control unit (260) of the harmonic reducer (200) controls a current formation unit (210) based on the power source phase synchronization signal (Spds) to reduce the harmonic component, which is included in the harmonic current flowing to the alternating-current power source (2) and which results from the cycle of the power-source voltage ($v_{ac}$).

A d-axis current control unit (268) of the current control unit (260) of the harmonic reducer (200) includes a first voltage calculation unit (2681), but not a second voltage calculation unit (2682).

Figure 11:
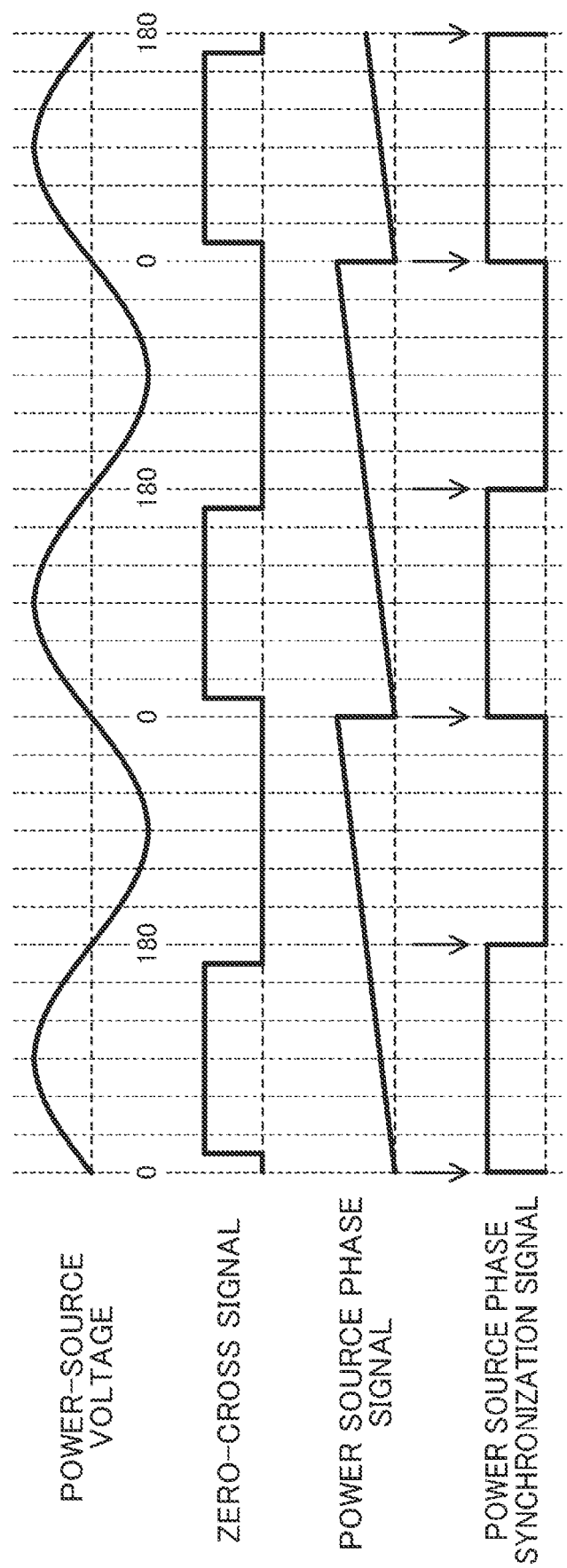
FIG. 11 is a timing chart showing examples of the waveforms of a power-source voltage, a zero-cross signal, a power source phase signal, and a power source phase synchronization signal of one of three phases according to the second embodiment.

FIG. 11 shows examples of the waveforms of the power-source voltage ($v_{ac}$), the zero-cross signal, the power source phase signal (ωt(fs)), and the power source phase synchronization signal (Spds) of one of three phases.

The other configurations of this embodiment are the same as, or similar to, those of the first embodiment. Thus, the like reference characters are used to indicate the like components, and their detailed descriptions will not be repeated.

As can be seen, according to the second embodiment, the power source phase synchronization signal (Spds) is transmitted to the harmonic reducer (200). Thus, the current control unit of the harmonic reducer (200) can accurately grasp the cycle of the power-source voltage ($v_{ac}$) even if the harmonic reducer (200) is not provided with a means for detecting the cycle of the power-source voltage ($v_{ac}$).

Since the current control unit (260) controls the current formation unit (210) based on the power source phase synchronization signal (Spds), control of the circuit main portion (130) performed by the conversion control unit (140) and control of the current formation unit (210) performed by the current control unit (260) can be synchronized with each other.

The ripple reduction control section (342) controls the circuit main portion (130) to reduce the ripple component of frequency, which is included in the voltage between the DC side nodes (130a, 130b) of the inverter circuit (120) and which results from the cycle of the power-source voltage ($v_{ac}$). This can reduce the ripple component of frequency, which is included in the voltage between the DC side nodes of the inverter circuit (120) and which results from the cycle of the power-source voltage ($v_{ac}$).

The current control unit (260) controls the current formation unit (210) to reduce the harmonic component, which is included in the harmonic current and which results from the cycle of the power-source voltage ($v_{ac}$). This can reduce the harmonic component, which is included in the harmonic current flowing to the alternating-current power source (2) and which results from the cycle of the power-source voltage ($v_{ac}$).

First Variation of Second Embodiment

Figure 12:
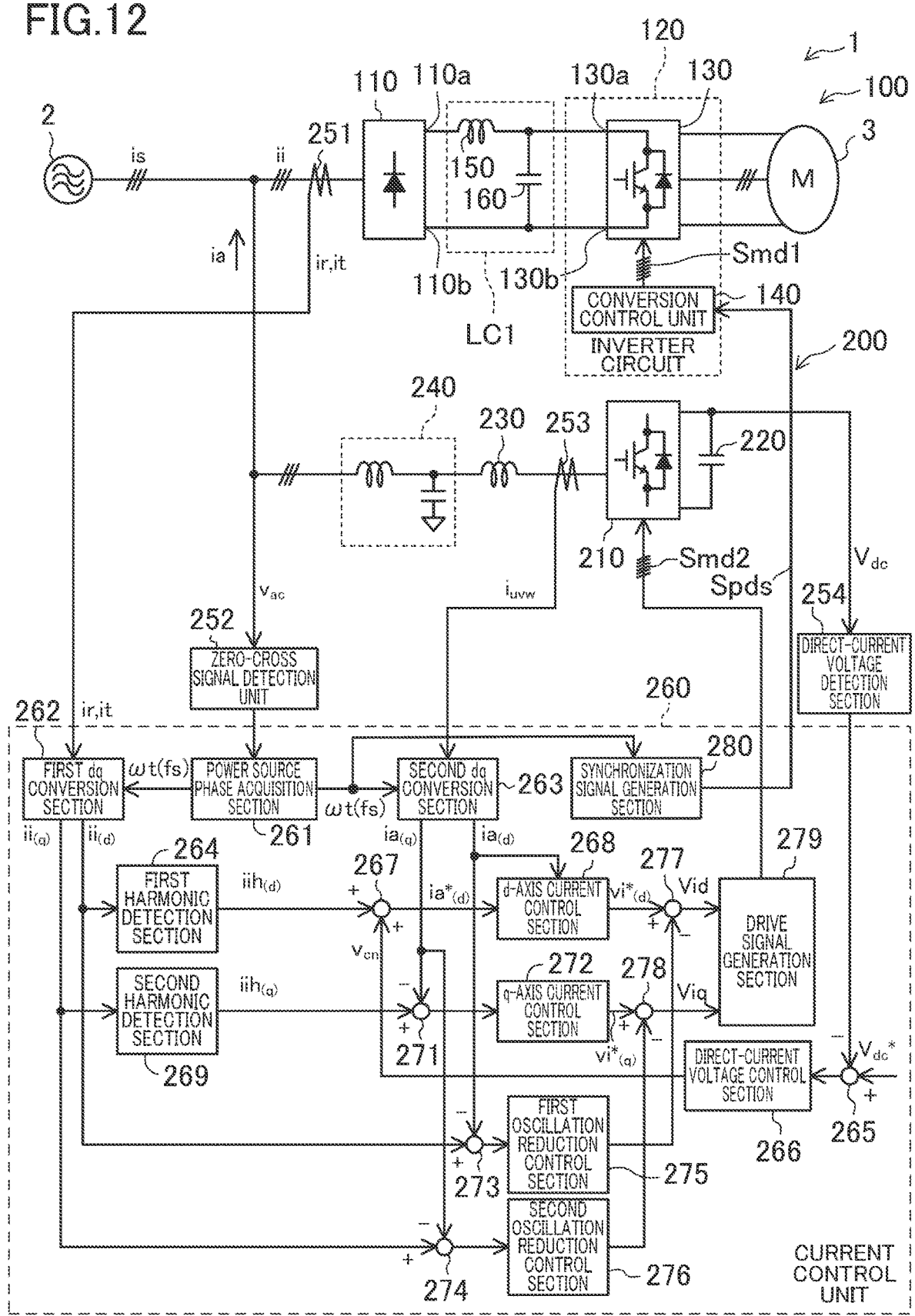
FIG. 12 illustrates a first variation of the second embodiment, corresponding to FIG. 3.

FIG. 12 shows a power conversion system (1) according to a first variation of the second embodiment. In the first variation, the power converter (100) is not provided with a zero-cross signal detection unit (171). The conversion control unit (140) of the power converter (100) does not include a synchronization signal generation section (346), and the power source phase acquisition section (341) estimates the power source phase signal (ωt(fs)) based on the power source phase synchronization signal (Spds).

The current control unit (260) of the harmonic reducer (200) further includes a synchronization signal generation section (280) serving as a synchronizer. The other configuration of the harmonic reducer (200) is the same as, or similar to, that of the first embodiment. Thus, just like the first embodiment, the power source phase acquisition section (261) of the current control unit (260) estimates or detects the power source phase signal (ωt(fs)) based on the zero-cross signal output from the zero-cross signal detection unit (252).

The current control unit (260) controls the current formation unit (210) based on the power source phase signal (ωt(fs)) to reduce the harmonic component, which is included in the harmonic current flowing to the alternating-current power source (2) and which results from the cycle of the power-source voltage ($v_{ac}$).

The synchronization signal generation section (280) generates the power source phase synchronization signal (Spds), based on the power source phase signal (ωt(fs)) estimated by the power source phase acquisition section (261), and transmits the generated signal to the conversion control unit (140) of the inverter circuit (120). In the first variation, the power source phase synchronization signal (Spds) serves as a signal obtained by frequency division of the operation clock of the current control unit (260), and serves as a control synchronization signal synchronized with the operation clock.

The ripple reduction control section (342) of the conversion control unit (140) controls the circuit main portion (130) based on the power source phase synchronization signal (Spds) generated by the synchronization signal generation section (280) to reduce the ripple component of frequency, which is included in the voltage between the DC side nodes (130a, 130b) of the inverter circuit (120) and which results from the cycle of the power-source voltage ($v_{ac}$).

The other configurations of this embodiment are the same as, or similar to, those of the second embodiment. Thus, the like reference characters are used to indicate the like components, and their detailed descriptions will not be repeated.

As can be seen, according to the first variation of the second embodiment, the power source phase synchronization signal (Spds) is transmitted to the inverter circuit (120). Thus, the conversion control unit (140) of the inverter circuit (120) can accurately grasp the cycle of the power-source voltage ($v_{ac}$) even if the inverter circuit (120) is provided with a means for detecting the cycle of the power-source voltage ($v_{ac}$).

Since the conversion control unit (140) controls the inverter circuit (120) based on the power source phase synchronization signal (Spds), control of the circuit main portion (130) performed by the conversion control unit (140) and control of the current formation unit (210) performed by the current control unit (260) can be synchronized with each other.

The ripple reduction control section (342) controls the circuit main portion (130) to reduce the ripple component of frequency, which is included in the voltage between the DC side nodes (130a, 130b) of the inverter circuit (120) and which results from the cycle of the power-source voltage ($v_{ac}$). This can reduce the ripple components of frequency, which is included in the voltage between the DC side nodes (130a, 130b) of the inverter circuit (120) and which result from the cycle of the power-source voltage ($v_{ac}$).

The current control unit (260) controls the current formation unit (210) to reduce the harmonic component, which is included in the harmonic current and which results from the cycle of the power-source voltage ($v_{ac}$). This can reduce the harmonic component, which is included in the harmonic current flowing to the alternating-current power source (2) and which results from the cycle of the power-source voltage ($v_{ac}$).

Second Variation of Second Embodiment

Figure 13:
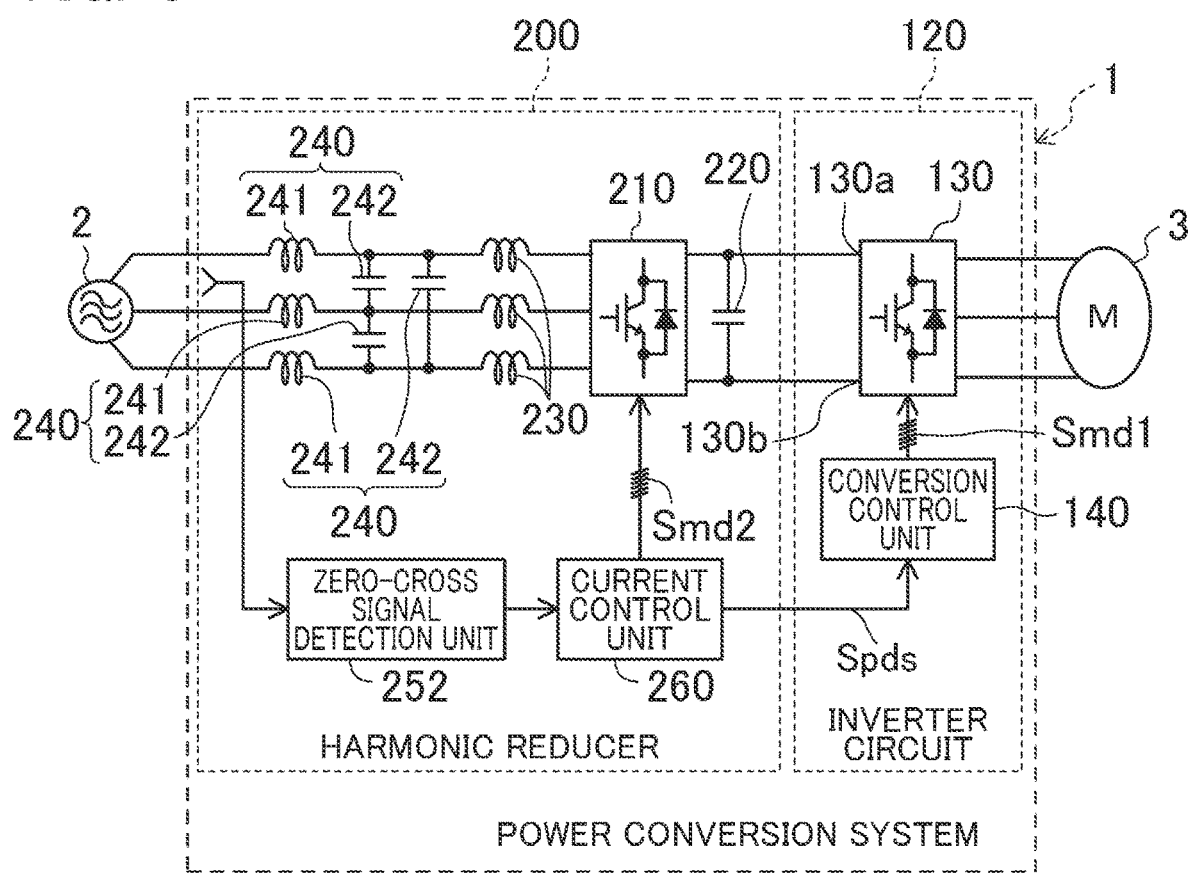
FIG. 13 illustrates a second variation of the second embodiment, corresponds to FIG. 1.

FIG. 13 shows a power conversion system (1) according to a second variation of the second embodiment of the present disclosure. A harmonic reducer (200) is connected in series to the DC side of the inverter circuit (120). More specifically, a harmonic reducer capacitor (220) is connected between the first and second DC side nodes (130a, 130b). In the second variation, the harmonic reducer (200) includes the synchronization signal generation section (280) of the first variation of the second embodiment in addition to the components of the harmonic reducer (200) of the first variation of the first embodiment.

The other configurations of this embodiment are the same as, or similar to, those of the first variation of the second embodiment. Thus, the like reference characters are used to indicate the like components, and their detailed descriptions will not be repeated.

THIRD EMBODIMENT

Figure 14:
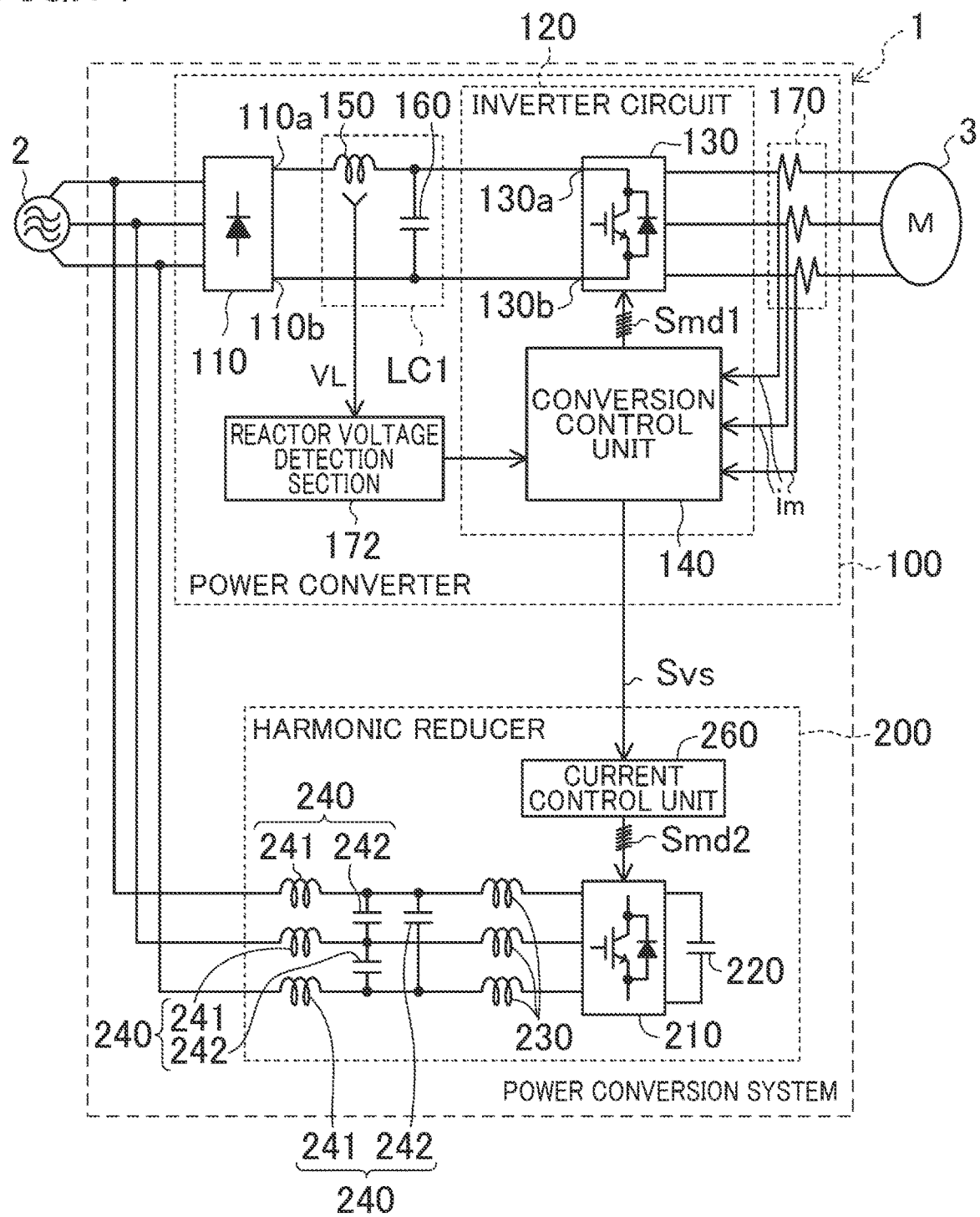
FIG. 14 illustrates a third embodiment, corresponding to FIG. 1.

FIG. 14 shows a power conversion system (1) according to a third embodiment of the present disclosure. In the third embodiment, a power converter (100) further includes a motor current detection unit (170) and a reactor voltage detection section (172) in addition to the components of the first embodiment.

The motor current detection unit (170) detects motor currents ($i_m$) output from a circuit main portion (130) of an inverter circuit (120).

The reactor voltage detection section (172) detects the voltage (VL) of a power converter reactor (150).

A conversion control unit (140) generates an oscillation synchronization signal (Svs) synchronized with oscillations of the voltage (VL) of the power converter reactor (150), based on the value of the voltage (VL) of the power converter reactor (150) detected by the reactor voltage detection section (172), and transmits the generated oscillation synchronization signal (Svs) to a current control unit (260). The conversion control unit (140) controls the circuit main portion (130) of the inverter circuit (120) based on the cycle of the oscillation synchronization signal (Svs). The oscillation synchronization signal (Svs) is a signal obtained by frequency division of the operation clock of the conversion control unit (140), and is a control synchronization signal synchronized with the operation clock.

Figure 15:
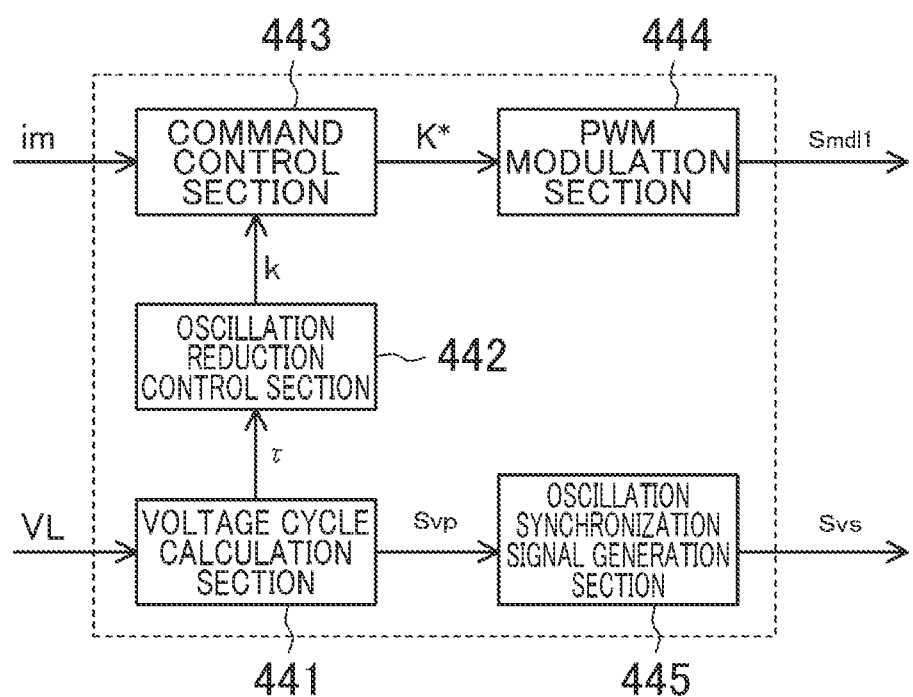
FIG. 15 corresponds to FIG. 10 and illustrates the third embodiment.

As shown in FIG. 15, the conversion control unit (140) includes a voltage cycle calculation unit (441), an oscillation reduction control unit (442), a command control unit (443), a PWM modulation section (444), and an oscillation synchronization signal generation section (445) serving as a synchronizer.

The voltage cycle calculation unit (441) acquires an oscillation cycle (τ) of the voltage (VL) detected by the reactor voltage detection section (172) and an oscillation phase signal (Svp). The oscillation phase signal (Svp) is a signal indicating the phase of oscillation of the voltage (VL).

The oscillation reduction control unit (442) calculates a control gain (k) from the oscillation cycle (τ), the inductance of the power converter reactor (150), the capacitance of the power converter capacitor (160), and an attenuation coefficient command, and outputs the calculated control gain (k).

The command control unit (443) obtains the product of the control gain (k) output by the oscillation reduction control unit (442) and the motor current ($i_m$) detected by the motor current detection unit (170), subtracts the product from a received command value to obtain a voltage control factor command (K*), and outputs the obtained voltage control factor command (K*).

A detailed method for calculating the control gain (k) and the voltage control factor command (K*) has been widely known, and therefore its detailed description is omitted herein. The detailed method for calculating the control gain (k) and the voltage control factor command (K*) is disclosed in, for example, Japanese Unexamined Patent Publication No. 2016-21854.

The PWM modulation section (444) generates a voltage command for the alternating current output by the inverter circuit (120) based on the voltage control factor command (K*), compares the voltage command to a first carrier wave, and outputs a first drive signal (Smd1).

The oscillation synchronization signal generation section (445) generates the oscillation synchronization signal (Svs) synchronized with the oscillation of the voltage (VL) of the power converter reactor (150) based on the oscillation phase signal (Svp), and transmits the generated oscillation synchronization signal (Svs) to the current control unit (260) of the harmonic reducer (200). The oscillation synchronization signal (Svs) is a signal that switches between high level and low level at every oscillation cycle (τ). The timing at which the oscillation synchronization signal (Svs) switches is the timing at which the oscillation phase signal (Svp) indicates a phase of 360°.

The current control unit (260) of the harmonic reducer (200) controls the current formation unit (210) based on the oscillation synchronization signal (Svs) to reduce the harmonic component, which is included in the harmonic current and which results from oscillations of the voltage (VL) of the power converter reactor (150).

More specifically, an oscillation reduction control gain (k2) for use in a computation performed by the first and second oscillation reduction control sections (275, 276) is set to be variable. More specifically, the current control unit (260) further has the function of specifying the oscillation cycle (τ) based on the oscillation synchronization signal (Svs) and setting the oscillation reduction control gain (k2) in accordance with the oscillation cycle (τ).

A second voltage calculation section (2682) of a d-axis current control section (268) of the current control unit (260) calculates a second voltage command value based on the oscillation synchronization signal (Svs) to reduce the harmonic component, which is included in the harmonic current flowing to the alternating-current power source (2) and which results from oscillations of the voltage (VL) of the power converter reactor (150).

That is, the second voltage calculation section (2682) generates an oscillation phase signal (ωt(fm)) indicating the oscillation phase, based on the oscillation synchronization signal (Svs), and uses the oscillation phase signal (ωt(fm)) instead of the electrical angle phase signal (ωt(fm)) to perform computation.

Figure 16:
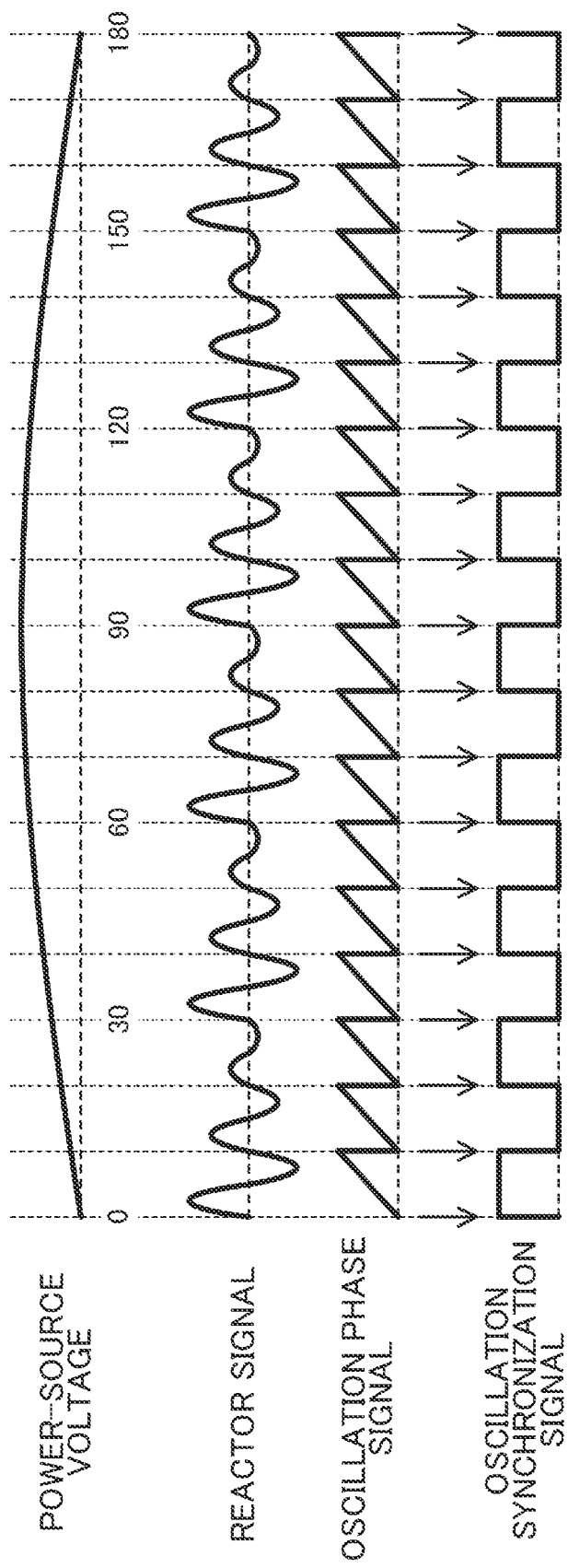
FIG. 16 is a timing chart showing examples of a power-source voltage, a power converter reactor voltage, an oscillation phase signal, and an oscillation synchronization signal of one of three phases according to the third embodiment.

FIG. 16 shows examples of the power-source voltage ($v_{ac}$), the voltage (VL) of the power converter reactor (150), the oscillation phase signal (Svp), and the oscillation synchronization signal (Svs) of one of three phases.

The other configurations of this embodiment are the same as, or similar to, those of the first embodiment. Thus, the like reference characters are used to indicate the like components, and their detailed descriptions will not be repeated.

As can be seen, according to the third embodiment, the oscillation synchronization signal (Svs) is transmitted to the harmonic reducer (200). Thus, the current control unit (260) of the harmonic reducer (200) can accurately grasp the cycle of oscillations of the voltage (VL) of the power converter reactor (150) even if the harmonic reducer (200) is not provided with a means for detecting the cycle of oscillations of the voltage (VL) of the power converter reactor (150).

Since the current control unit (260) controls the current formation unit (210) based on the oscillation synchronization signal (Svs), control of the circuit main portion (130) performed by the conversion control unit (140) and control of the current formation unit (210) performed by the current control unit (260) can be synchronized with each other.

The current control unit (260) controls the current formation unit (210) to reduce the harmonic component, which is included in the harmonic current and which results from the oscillations of the voltage (VL) of the power converter reactor (150). This can reduce the harmonic component, which is included in the harmonic current flowing to the alternating-current power source (2) and which results from the oscillations of the voltage (VL) of the power converter reactor (150).

FOURTH EMBODIMENT

Figure 17:
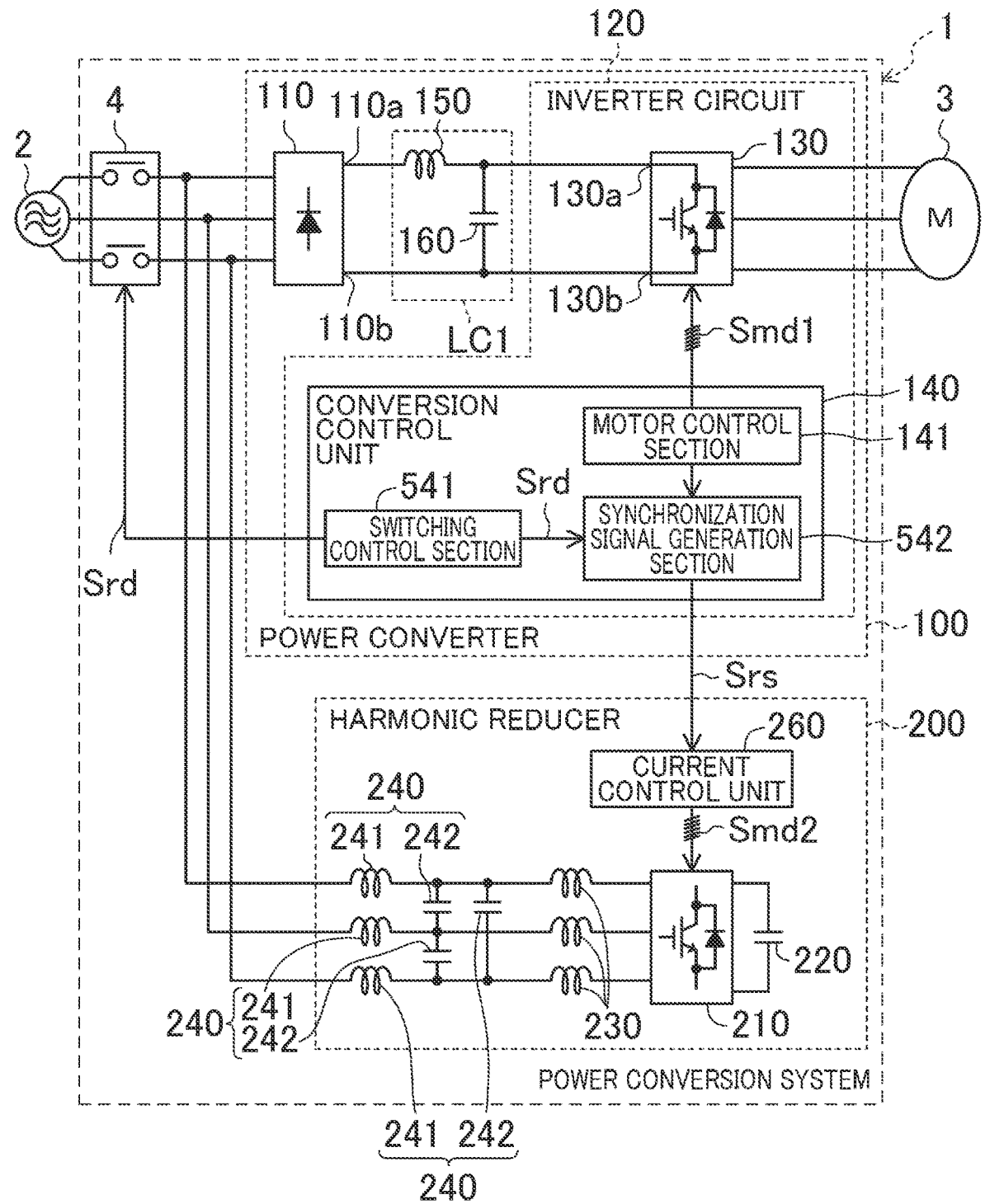
FIG. 17 illustrates a fourth embodiment, corresponding to FIG. 1.
Figure 18:
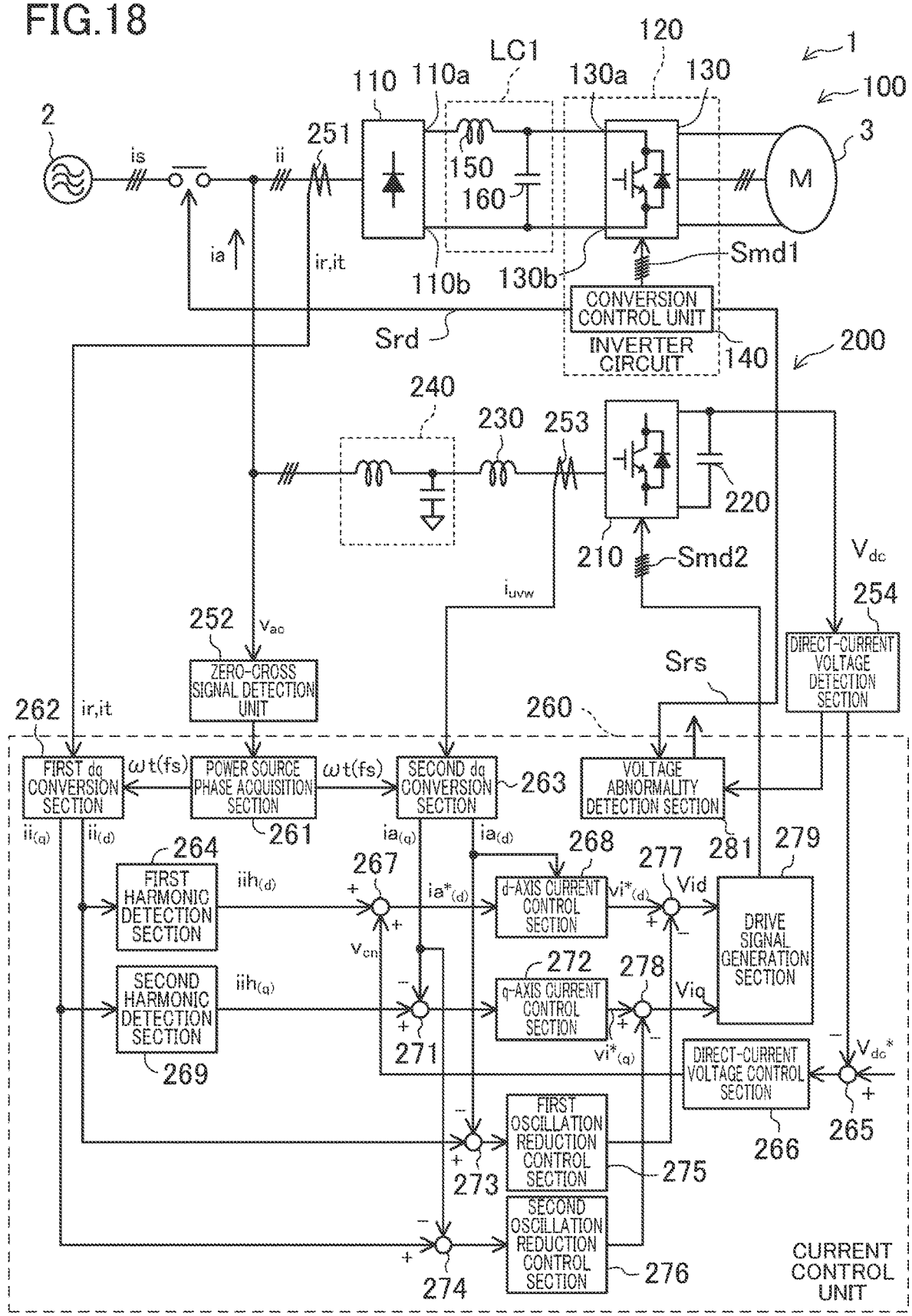
FIG. 18 illustrates the fourth embodiment, corresponds to FIG. 3.

FIGS. 17 and 18 show a power conversion system (1) according to a fourth embodiment of the present invention. In the fourth embodiment, the power conversion system (1) further includes a breaker (4) provided in a current path between an alternating-current power source (2) and a combination of an inverter circuit (120) and a harmonic reducer (200). A conversion control unit (140) further includes a switching control unit (541), and includes a synchronization signal generation section (542) serving as a synchronizer instead of the synchronization signal generation section (142) of the first embodiment.

The switching control unit (541) controls the switching of the breaker (4) in response to a relay drive signal (Srd), and inputs the relay drive signal (Srd) to the synchronization signal generation section (542).

The synchronization signal generation section (542) transmits the switch signal (Srs) synchronized with the open/closed state of the breaker (4), as the synchronization signal, to the harmonic reducer (200).

The current control unit (260) of the harmonic reducer (200) includes a voltage abnormality detection unit (281) in addition to the components of the first embodiment.

If the switch signal (Srs) indicates the closed state, and a determination is made that the voltage ($v_{dc}$) detected by the direct-current voltage detection unit (254) satisfies a predetermined abnormal condition, the voltage abnormality detection unit (281) senses an abnormality, and allows an alarm system (not shown) to output an alarm. The predetermined abnormal condition is, for example, the condition that the voltage ($v_{dc}$) detected by the direct-current voltage detection unit (254) be less than a predetermined threshold value (the voltage ($v_{dc}$) be insufficient).

A d-axis current control section (268) of the current control unit (260) of the harmonic reducer (200) includes a first voltage calculation unit (2681), but not a second voltage calculation unit (2682).

Figure 19:
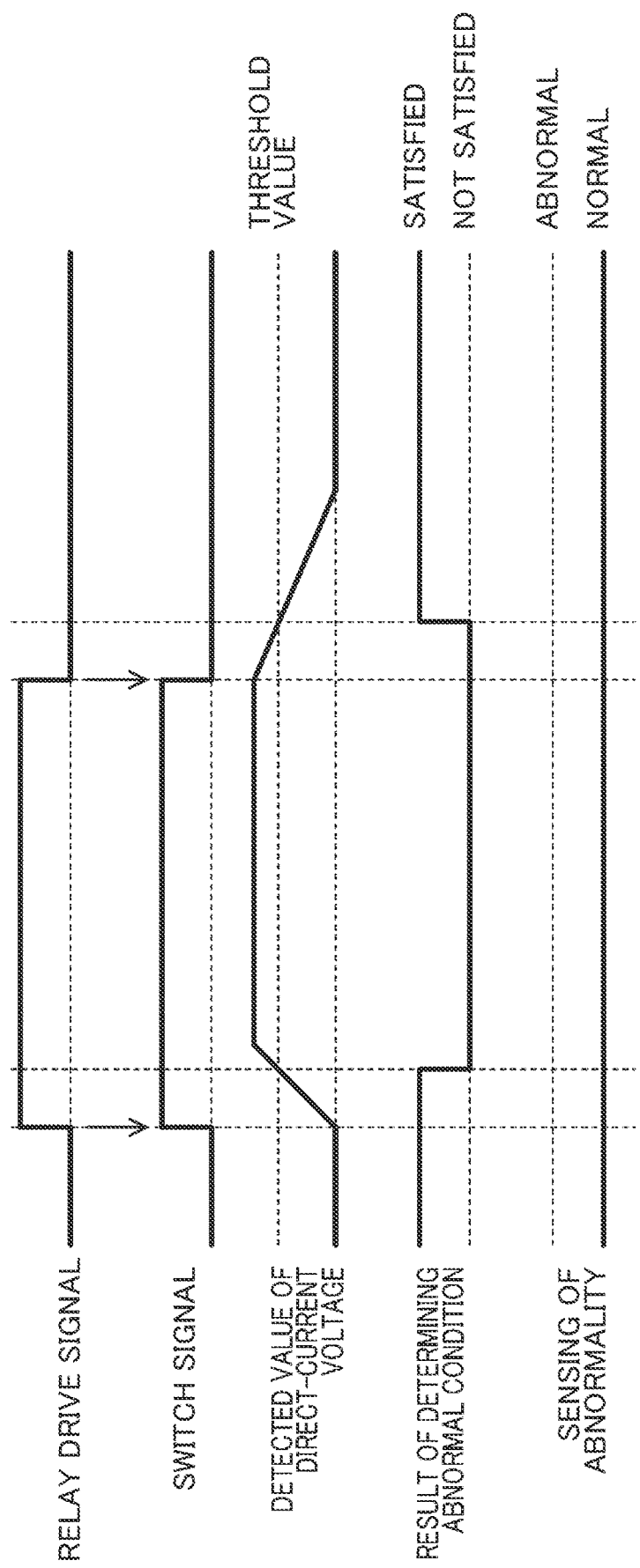
FIG. 19 is a timing chart showing a relay drive signal, a switch signal, the voltage detected by a direct-current voltage detection unit with the result of determining an abnormal condition, and the result of sensing whether or not an abnormality has been sensed according to the fourth embodiment.

FIG. 19 shows the relay drive signal (Srd), the switch signal (Srs), the voltage ($v_{dc}$) detected by the direct-current voltage detection unit (254) with the result of determining the abnormal condition, and the result of sensing whether or not an abnormality has been sensed.

The other configurations of this embodiment are the same as, or similar to, those of the first embodiment. Thus, the like reference characters are used to indicate the like components, and their detailed descriptions will not be repeated.

As can be seen, according to the fourth embodiment, the switch signal (Srs) is transmitted to the harmonic reducer (200). Thus, the harmonic reducer (200) can accurately grasp the open/closed state of the breaker (4) even if the harmonic reducer (200) is not provided with a means for detecting the open/closed state of the breaker (4).

Even if, while the breaker (4) is in the open state, the voltage ($v_{dc}$) detected by the direct-current voltage detection unit (254) satisfies the predetermined abnormal condition, an abnormality is not sensed. This can prevent an abnormality from being erroneously sensed while the breaker (4) is in the open state.

First Variation of Fourth Embodiment

Figure 20:
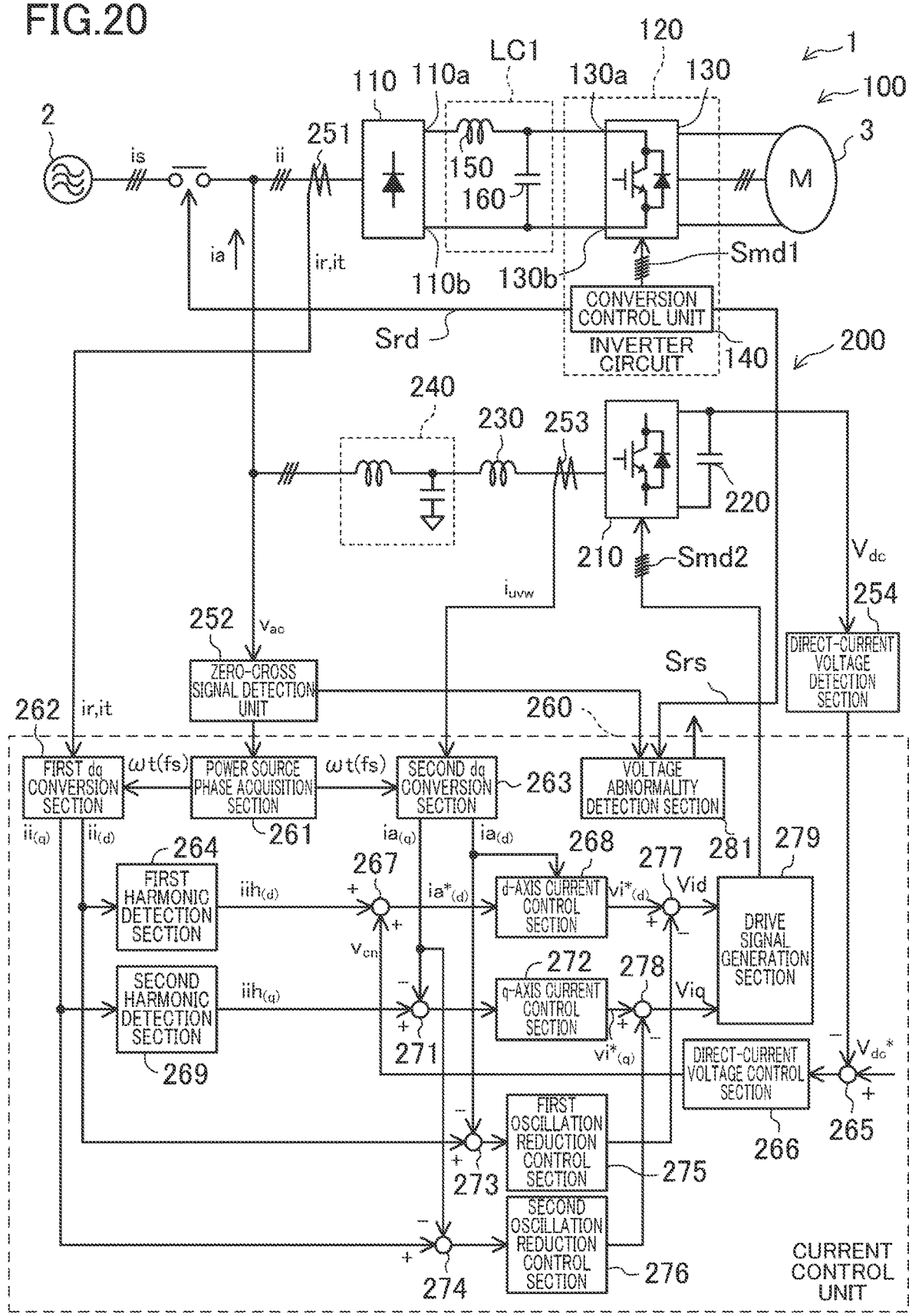
FIG. 20 corresponds to FIG. 3 and illustrates a first variation of the fourth embodiment.

FIG. 20 shows a power conversion system (1) according to a first variation of the fourth embodiment of the present invention. In the first variation, if the switch signal (Srs) indicates the closed state, and a zero-cross signal output from a zero-cross signal detection unit (252) satisfies a predetermined abnormal condition, a voltage abnormality detection unit (281) senses an abnormality. The predetermined abnormal condition is, for example, the condition that the period during which the zero-cross signal does not change has continued for a predetermined period.

The other configurations of this embodiment are the same as, or similar to, those of the fourth embodiment. Thus, the like reference characters are used to indicate the like components, and their detailed descriptions will not be repeated.

Thus, according to the first variation of the fourth embodiment, even if, while the breaker (4) is in the open state, the zero-cross signal satisfies the predetermined abnormal condition, an abnormality is not sensed. This can prevent an abnormality in the alternating-current power source (2) from being erroneously sensed while the breaker (4) is in the open state.

FIFTH EMBODIMENT

Figure 21:
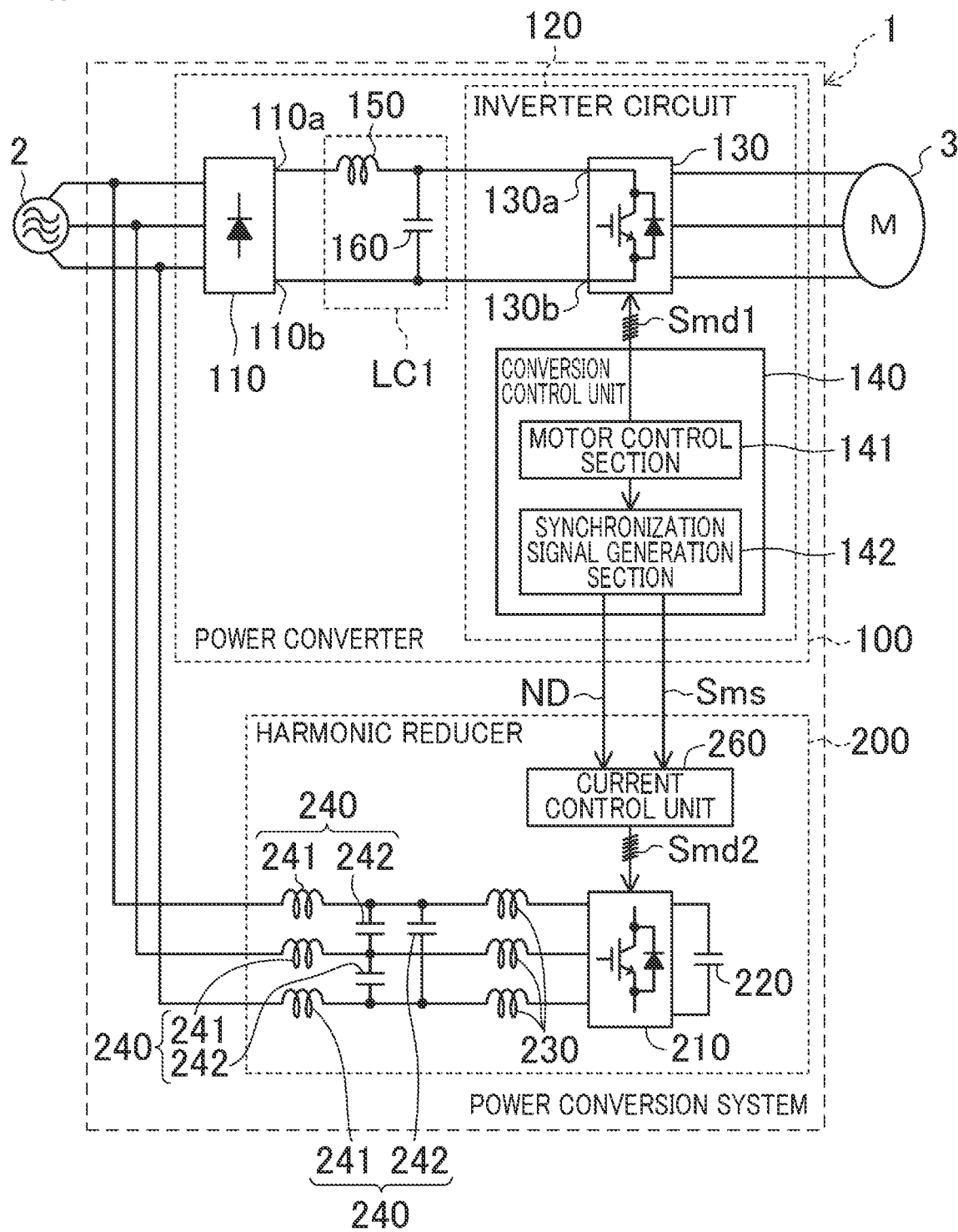
FIG. 21 corresponds to FIG. 1 and illustrates a fifth embodiment.

FIG. 21 shows a power conversion system (1) according to a fifth embodiment of the present invention. In the fifth embodiment, a synchronization signal generation section (142) of a conversion control unit (140) generates, in addition to a motor phase synchronization signal (Sms), numerical data (ND) numerically indicating the period corresponding to the cycle of one of at least the motor phase synchronization signal (Sms), the power source phase synchronization signal (Spds) of the second embodiment, or the oscillation synchronization signal (Svs) of the third embodiment, and transmits the generated motor phase synchronization signal (Sms) and numerical data (ND) to a current control unit (260) of a harmonic reducer (200).

The other configurations of this embodiment are the same as, or similar to, those of the first embodiment. Thus, the like reference characters are used to indicate the like components, and their detailed descriptions will not be repeated.

Thus, according to the fifth embodiment, even if a time error occurs between operation clocks of the conversion control unit (140) and the current control unit (260), the current control unit (260) refers to the synchronization signal and the numerical data (ND) transmitted by the conversion control unit (140) to enable synchronization between control of a circuit main portion (130) performed by the conversion control unit (140) and control of the current formation unit (210) performed by the current control unit (260).

SIXTH EMBODIMENT

Figure 22:
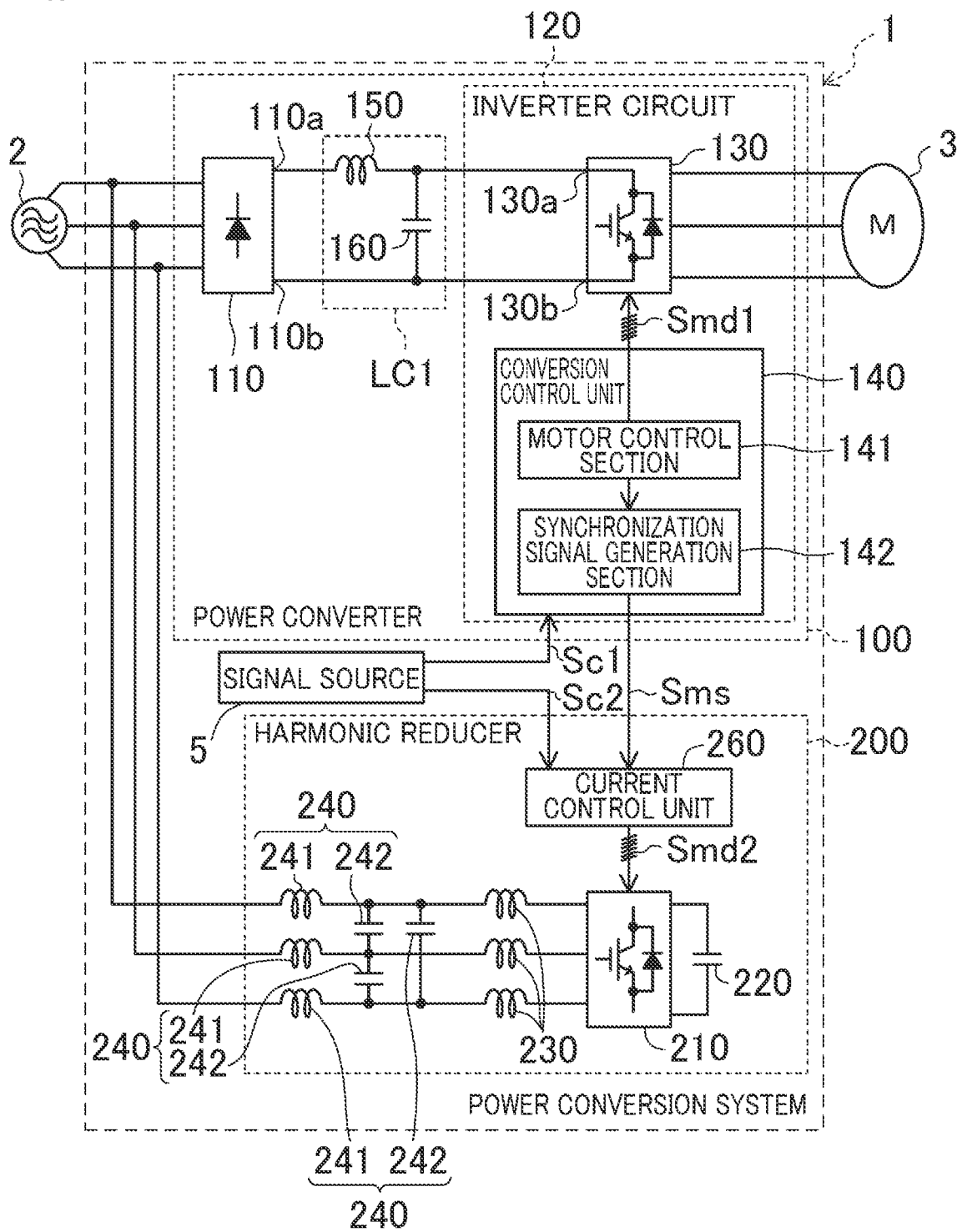
FIG. 22 corresponds to FIG. 1 and illustrates a sixth embodiment.

FIG. 22 shows a power conversion system (1) according to a sixth embodiment. In the sixth embodiment, the power conversion system (1) further includes a signal source (5) serving as a synchronizer in addition to the components of the first embodiment.

The signal source (5) outputs first and second cyclic signals (Sc1, Sc2) predetermined and being in synchronization with each other.

A conversion control unit (140) receives the first cyclic signal (Sc1) from the signal source (5).

A current control unit (260) receives the second cyclic signal (Sc2) from the signal source (5).

Although the description herein has illustrated examples in which the first and second cyclic signals (Sc1, Sc2) are output from the same single signal source (5), it may be so configured that two signal sources are provided, and the first and second cyclic signals (Sc1, Sc2) are output from the different signal sources.

Thus, according to the sixth embodiment, the conversion control unit (140) can recognize the length of the operation clock of the conversion control unit (140) based on the first cyclic signal (Sc1), and the current control unit (260) can recognize the length of the operation clock of the current control unit (260) based on the second cyclic signal (Sc2). In addition, the first and second cyclic signals (Sc1, Sc2) are synchronized with each other. Thus, the state of the inverter circuit (120) can be synchronized with the state of the harmonic reducer (200).

Other Variations

The first variation of the first embodiment may be modified such that, as in the fifth embodiment, the synchronization signal generation section (142) of the conversion control unit (140) generates, in addition to the motor phase synchronization signal (Sms), numerical data (ND) numerically indicating the period corresponding to the cycle of the motor phase synchronization signal (Sms), and transmits the generated motor phase synchronization signal (Sms) and numerical data (ND) to the current control unit (260) of the harmonic reducer (200).

The first embodiment may be modified such that the current control unit (260) of the harmonic reducer (200) is provided with the synchronization signal generation section (280) of the first variation of the second embodiment, and that this synchronization signal generation section (280) transmits the power source phase synchronization signal (Spds) to the conversion control unit (140) of the inverter circuit (120). The conversion control unit (140) may generate numerical data (ND) numerically indicating one or more of the period corresponding to the cycle of the motor phase synchronization signal (Sms) of the first embodiment, the period corresponding to the cycle of the power source phase synchronization signal (Spds), or the period corresponding to the cycle of the oscillation synchronization signal (Svs) of the third embodiment to transmit the generated numerical data (ND) to the current control unit (260) of the harmonic reducer (200).

The second embodiment may be modified such that, as in the fifth embodiment, the synchronization signal generation section (346) of the conversion control unit (140) generates, in addition to the power source phase synchronization signal (Spds), numerical data (ND) numerically indicating one or more of the period corresponding to the cycle of the power source phase synchronization signal (Spds), the period corresponding to the cycle of the motor phase synchronization signal (Sms) of the first embodiment, or the period corresponding to the cycle of the oscillation synchronization signal (Svs) of the third embodiment to transmit the generated power source phase synchronization signal (Spds) and numerical data (ND) to the current control unit (260) of the harmonic reducer (200).

The first variation of the second embodiment may be configured such that, as in the fifth embodiment, the synchronization signal generation section (280) of the harmonic reducer (200) generates, in addition to the power source phase synchronization signal (Spds), numerical data numerically indicating the period corresponding to the cycle of the power source phase synchronization signal (Spds) to transmit the generated power source phase synchronization signal (Spds) and numerical data to the conversion control unit (140) of the inverter circuit (120).

The third embodiment may be modified such that, as in the fifth embodiment, the oscillation synchronization signal generation section (445) of the conversion control unit (140) generates the oscillation synchronization signal (Svs) and numerical data (ND) numerically indicating one or more of the period corresponding to the cycle of the power source phase synchronization signal (Spds), the period corresponding to the cycle of the motor phase synchronization signal (Sms) of the first embodiment, or the period corresponding to the cycle of the oscillation synchronization signal (Svs) of the third embodiment to transmit the generated oscillation synchronization signal (Svs) and numerical data (ND) to the current control unit (260) of the harmonic reducer (200).

The fourth embodiment may be configured such that, the synchronization signal generation section (542) generates the switch signal (Srs) and numerical data numerically indicating one or more of the period corresponding to the cycle of the motor phase synchronization signal (Sms) of the first embodiment, the period corresponding to the cycle of the power source phase synchronization signal (Spds) of the second embodiment, or the period corresponding to the cycle of the oscillation synchronization signal (Svs) of the third embodiment to transmit the generated switch signal (Srs) and numerical data to the current control unit (260) of the harmonic reducer (200).

The fifth embodiment may be configured such that, the synchronization signal generation section (142) of the conversion control unit (140) transmits, to the current control unit (260) of the harmonic reducer (200) as the synchronization signal synchronized with the operation clock of the conversion control unit (140), a signal other than the motor phase synchronization signal (Sms), the power source phase synchronization signal (Spds), the oscillation synchronization signal (Svs), and the switch signal (Srs), instead of the motor phase synchronization signal (Sms).

Each of the first and fifth embodiments may be modified such that the current control unit (260) has the function of stopping an operation of the current formation unit (210) when the motor phase synchronization signal (Sms) satisfies a predetermined condition. The predetermined condition is, for example, a condition that the motor phase synchronization signal (Sms) not change for a predetermined period. Thus, when the motor phase synchronization signal (Sms) satisfies the predetermined condition, the operation of the current formation unit (210) can be stopped.

Likewise, the second embodiment may be configured such that the current control unit (260) has the function of stopping an operation of the current formation unit (210) when the power source phase synchronization signal (Spds) satisfies a predetermined condition. The predetermined condition is, for example, a condition that the power source phase synchronization signal (Spds) has not changed for a predetermined period.

Likewise, the third embodiment may be configured such that the current control unit (260) has the function of stopping an operation of the current formation unit (210) when the oscillation synchronization signal (Svs) satisfies a predetermined condition. The predetermined condition is, for example, a condition that the oscillation synchronization signal (Svs) not change for a predetermined period.

The third embodiment may be configured such that the power converter (100) is provided with a detection unit that detects current flowing through the power converter reactor (150) instead of the reactor voltage detection section (172), and the conversion control unit (140) generates an oscillation synchronization signal (Svs) based on the detected value of the current flowing through the power converter reactor (150). The third embodiment may be configured such that the power converter (100) is provided with a detection unit that detects the voltage of the power converter capacitor (160) instead of the reactor voltage detection section (172), and the conversion control unit (140) generates an oscillation synchronization signal (Svs) based on the detected value of the voltage of the power converter capacitor (160). The third embodiment may be configured such that the power converter (100) is provided with a detection unit that detects the output current of the rectifier circuit (110) instead of the reactor voltage detection section (172), and the conversion control unit (140) may generate an oscillation synchronization signal (Svs) based on the detected value of the output current of the rectifier circuit (110). The third embodiment may be configured such that the power converter (100) is provided with a detection unit that detects the input current of the power converter (100) instead of the reactor voltage detection section (172), and the conversion control unit (140) may generate an oscillation synchronization signal (Svs) based on the detected value of the input current of the power converter (100). The third embodiment may be configured such that the conversion control unit (140) generates an oscillation synchronization signal (Svs) based on two or more of the voltage (VL) of the power converter reactor (150), the current flowing through the power converter reactor (150), the voltage of the power converter capacitor (160), the output current of the rectifier circuit (110), and the input current of the power converter (100).

The present disclosure is usefully applicable to a power conversion system including an inverter circuit, which operates with electric power supplied from an alternating-current power source, and a harmonic reducer connected to the alternating-current power source.

The invention claimed is:

1. A power conversion system comprising:
an inverter circuit operable with electric power supplied from an alternating-current power source;
a harmonic reducer connected to the alternating-current power source; and
a synchronizer,
the inverter circuit including a circuit main portion and a conversion control unit configured to control the circuit main portion,
the harmonic reducer including a current control unit configured to perform control to reduce a harmonic current flowing to the alternating-current power source,
the current control unit being configured as a computer different from the conversion control unit,
the synchronizer being configured to synchronize a state of the harmonic reducer with a state of the inverter circuit, and
the synchronizer being a synchronization signal generation section included in one of the conversion control unit and the current control unit, the synchronization signal generation section being configured to generate a synchronization signal synchronized with an operation clock of the one of the conversion control unit and the current control unit and to transmit the synchronization signal to the other of the conversion control unit and the current control unit.

2. The power conversion system of claim 1, wherein the synchronization signal switches between a high level and a low level.

3. The power conversion system of claim 1, wherein the synchronization signal is a cyclic signal.

4. The power conversion system of claim 3, wherein the inverter circuit drives a motor,
the harmonic reducer further includes a current formation unit connected to the alternating-current power source via an interconnection reactor, the current formation unit being configured to form a current flowing to the alternating-current power source,
the current control unit is configured to control the current formation unit to reduce the harmonic current,
the one of the inverter circuit or the harmonic reducer is the inverter circuit, and
the synchronization signal is a motor phase synchronization signal synchronized with an electrical angle of the motor.

5. The power conversion system of claim 4, wherein the current control unit includes
a power source phase acquisition section configured to estimate or detect a power source phase signal synchronized with a power-source voltage output by the alternating-current power source,
a first voltage calculation section configured to calculate a first voltage command value based on the power source phase signal to reduce a harmonic component, which is included in the harmonic current and which results from a cycle of the power-source voltage, and
a second voltage calculation section configured to calculate a second voltage command value based on the motor phase synchronization signal to reduce a harmonic component, which is included in the harmonic current and which results from rotation of the motor, and
the current formation unit is controlled based on the first and second voltage command values.

6. The power conversion system of claim 5, wherein the first voltage calculation section and the second voltage calculation section are configured to calculate the first voltage command value and the second voltage command value, respectively, in parallel.

7. The power conversion system of claim 4, wherein the current control unit is configured to stop an operation of the current formation unit in response to the synchronization signal satisfying a predetermined condition.

8. The power conversion system of claim 3, wherein the harmonic reducer further includes a current formation unit connected to the alternating-current power source via an interconnection reactor, the current formation unit being configured to form a current flowing to the alternating-current power source,
the current control unit is configured to control the current formation unit to reduce the harmonic current,
the one of the inverter circuit or the harmonic reducer is the inverter circuit, and
the synchronization signal is a power source phase synchronization signal synchronized with a power source voltage output by the alternating-current power source.

9. The power conversion system of claim 8, wherein the conversion control unit includes:
a power source phase acquisition section configured to estimate or detect a power source phase signal synchronized with the power-source voltage output by the alternating-current power source,
a synchronization signal generation section configured to generate the power source phase synchronization signal based on the power source phase signal, and
a ripple reduction control section configured to control the circuit main portion based on the power source phase signal to reduce a ripple component of frequency, which is included in a voltage between DC side nodes of the inverter circuit and which results from a cycle of the power-source voltage, and
the current control unit is configured to control the current formation unit based on the power source phase synchronization signal to reduce the harmonic component, which is included in the harmonic current and which results from the cycle of the power-source voltage.

10. The power conversion system of claim 8, wherein the current control unit is configured to stop an operation of the current formation unit in response to the synchronization signal satisfying a predetermined condition.

11. The power conversion system of claim 3, wherein the harmonic reducer further includes a current formation unit connected to the alternating-current power source via an interconnection reactor, the current formation unit being configured to form a current flowing to the alternating-current power source,
the current control unit is configured to control the current formation unit to reduce the harmonic current,
the one of the inverter circuit or the harmonic reducer is the harmonic reducer, and
the synchronization signal is a power source phase synchronization signal synchronized with a power source voltage output by the alternating-current power source.

12. The power conversion system of claim 11, wherein the current control unit includes
a power source phase acquisition section configured to estimate or detect a power source phase signal synchronized with a power-source voltage output by the alternating-current power source, and
a synchronization signal generation section configured to generate the power source phase synchronization signal based on the power source phase signal,
the current control unit is configured to control the current formation unit based on the power source phase signal to reduce the harmonic component, which is included in the harmonic current and which results from a cycle of the power-source voltage, and
the conversion control unit includes a ripple reduction control unit configured to control the circuit main portion based on the power source phase synchronization signal to reduce a ripple component of frequency, which is included in a voltage between DC side nodes of the inverter circuit and which results from a cycle of the power-source voltage.

13. The power conversion system of claim 3, wherein the harmonic reducer is connected to the alternating-current power source in parallel with a power converter,
the power converter includes
a rectifier circuit configured to rectify a first alternating current supplied from the alternating-current power source into a direct current, and to output the direct current,
the inverter circuit,
a power converter capacitor connected between DC side nodes of the inverter circuit, and
a power converter reactor connected between one of output ends of the rectifier circuit and one end of the power converter capacitor,
the circuit main portion of the inverter circuit includes a plurality of switching elements, and is configured to convert the direct current into a second alternating current by switching operations of the switching elements to supply the second alternating current to a load,
the conversion control unit is configured to generate an oscillation synchronization signal synchronized with oscillations of a voltage of the power converter reactor as the synchronization signal, based on a detected value of any one of
the voltage of the power converter reactor,
a current flowing through the power converter reactor,
a voltage of the power converter capacitor,
an output current of the rectifier circuit, and
an input current of the power converter to transmit the synchronization signal to the current control unit,
the harmonic reducer further includes a current formation unit connected to the alternating-current power source via an interconnection reactor, the current formation unit being configured to form a current flowing to the alternating-current power source, and
the current control unit is configured to control the current formation unit to reduce the harmonic current.

14. The power conversion system of claim 13, wherein the conversion control unit is configured to control the circuit main portion based on a cycle of the oscillation synchronization signal, and
the current control unit is configured to control the current formation unit based on the oscillation synchronization signal to reduce a harmonic component, which is included in the harmonic current and which results from the oscillations of the voltage of the power converter reactor.

15. The power conversion system of claim 3, wherein at least one of the conversion control unit and the current control unit is configured to transmit numerical data numerically indicating a period to the other of the conversion control unit and the current control unit via a telecommunication wire.

16. The power conversion system of claim 1, further comprising:
a breaker provided in a current path between the alternating-current power source and a combination of the inverter circuit and the harmonic reducer, the conversion control unit including the synchronization signal generation section and a switching control unit configured to control switching of the breaker; and
the synchronization signal generation section configured to transmit a switch signal synchronized with an open or closed state of the breaker, as the synchronization signal, to the harmonic reducer.

17. The power conversion system of claim 16, wherein the harmonic reducer further includes
a harmonic reducer capacitor,
a voltage detection unit configured to detect a voltage of the harmonic reducer capacitor, and
a current formation unit connected at an alternating current side thereof to the alternating-current power source via an interconnection reactor and at a direct current side thereof to the harmonic reducer capacitor, the current formation unit being configured to form a current flowing to the alternating-current power source, and the current control unit is configured to control the current formation unit to reduce the harmonic current, and to sense an abnormality if the switch signal indicates the closed state and the voltage detected by the voltage detection unit satisfies a predetermined abnormal condition.

18. The power conversion system of claim 16, wherein the harmonic reducer further includes
- a current formation unit connected to the alternating-current power source via an interconnection reactor to form a current flowing to the alternating-current power source, and
- a zero-cross circuit configured to detect passage of a power-source voltage output by the alternating-current power source through a zero-cross point, and to output a zero-cross signal corresponding to a detection result, and the current control unit is configured to control the current formation unit to reduce the harmonic current, and to sense an abnormality if the switch signal indicates the closed state and the zero-cross signal output by the zero-cross circuit satisfies a predetermined abnormal condition.

19. The power conversion system of claim 1, wherein
the harmonic reducer further includes a current formation unit connected to the alternating-current power source via an interconnection reactor, the current formation unit being configured to form a current flowing to the alternating-current power source, the current control unit is configured to control the current formation unit to reduce the harmonic current, the current formation unit includes a pair of switching elements for each phase of the alternating-current power source, and at least one of the switching elements is made of a wide bandgap semiconductor material as a main material.

20. The power conversion system of claim 1, wherein
the synchronizer includes at least one signal source,
the conversion control unit is configured to receive a predetermined first cyclic signal from the at least one signal source, the current control unit is configured to receive a predetermined second cyclic signal from the at least one signal source, and the first and second cyclic signals are in synchronization with each other.

\* \* \* \* \*